United States Patent
Kniazev et al.

(10) Patent No.: US 10,209,685 B2
(45) Date of Patent: Feb. 19, 2019

(54) METHOD AND APPARATUS FOR PRECONDITIONED MODEL PREDICTIVE CONTROL

(71) Applicant: Mitsubishi Electric Research Laboratories, Inc., Cambridge, MA (US)

(72) Inventors: Andrei Kniazev, Cambridge, MA (US); Aleksandr Malyshev, Bergen (NO)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 546 days.

(21) Appl. No.: 14/926,650

(22) Filed: Oct. 29, 2015

(65) Prior Publication Data

US 2017/0123388 A1 May 4, 2017

(51) Int. Cl.
  *G05B 13/04* (2006.01)
  *G06F 17/12* (2006.01)
  *G06F 17/16* (2006.01)

(52) U.S. Cl.
  CPC ........... *G05B 13/048* (2013.01); *G06F 17/12* (2013.01); *G06F 17/16* (2013.01)

(58) Field of Classification Search
  CPC ........ G05B 13/048; G05B 2219/23456; G06F 17/11; G06F 17/16; G06F 17/12
  See application file for complete search history.

(56) References Cited

U.S. PATENT DOCUMENTS

| 5,107,452 A * | 4/1992 | Karmarkar | G06F 17/16 340/2.6 |
| 2005/0149209 A1* | 7/2005 | Wojsznis | G05B 11/32 700/30 |
| 2007/0055392 A1* | 3/2007 | D'Amato | G05B 13/048 700/44 |

(Continued)

OTHER PUBLICATIONS

Gonzalez et al. "Parallel Sparse Approximation Preconditioners for the solution of large dense linear system" World Scientific Engineering Society (2000) [retrieved on Feb. 12, 2018]. Retrieved from <http://www.wseas.us/e-library/conferences/vravrona2000/papers/190.pdf>.*

(Continued)

*Primary Examiner* — Aniss Chad
*Assistant Examiner* — Alfred H B Wechselberger
(74) *Attorney, Agent, or Firm* — Gene Vinokur; James McAleenan; Hironori Tsukamoto

(57) ABSTRACT

A method for a model predictive control (MPC) of a system determines entries of an approximate coefficient matrix only at locations identified in a map of locations as significant. The map of locations identifies each location of an entry in the approximate coefficient matrix as either significant or insignificant. The entries are determined using one or combination of an approximate coefficient function and an exact coefficient function. Next, the method determines a preconditioner using the approximate coefficient matrix and determines a solution vector by solving a matrix equation of the MPC with a coefficient matrix defined by an exact coefficient function at a current time step of a control using an iterative method with the preconditioner. The method generates a control signal for controlling the system using the solution vector.

20 Claims, 22 Drawing Sheets

(56) References Cited

U.S. PATENT DOCUMENTS

| | | | | |
|---|---|---|---|---|
| 2009/0292511 | A1* | 11/2009 | Vrancic | G06F 17/12 703/2 |
| 2012/0005247 | A1* | 1/2012 | Bekas | G06F 17/12 708/204 |
| 2012/0221301 | A1* | 8/2012 | Umeda | G05B 13/042 703/2 |
| 2013/0085730 | A1* | 4/2013 | Shaw | G01V 11/00 703/2 |

OTHER PUBLICATIONS

Wang et al. "MSP: A Class of Parallel Multistep Successive Sparse Approximate Inverse Preconditioning Strategies" SIAM Journal of Scientific Computing, vol. 24, No. 4 (2003) [retrieved on Feb. 12, 2018]. Retreived from <http://cs.engr.uky.edu/~jzhang/pub/PRINT/kaiwang03a.pdf>.*

Saad "Iterative Methods for Sparse Linear Systems" [book] 2nd Edition, Society for Industrial and Applied Mathematics (2003) [retrieved on Feb. 9, 2018]. Retrieved from <ftp://nozdr.ru/biblio/kolxo3/M/MN/MNl/Saad%20Y.%20Iterative%20methods%20for%20sparse%linear%20systems%20(2ed.,%20SIAM,%202003)(ISBN%200898715342)(O)(567s)_MNl_.pdf>.*

Eirola et al. "Accelerating with Rank-One Updates" Linear Algebra and Its Applications, vol. 121 (1989) [retrieved on Feb. 13, 2018]. Retrieved from <https://www.sciencedirect.com/science/article/pii/0024379589907192>.*

Baglama et al. "Adaptively Preconditioned GMRES Algorithms" SIAM Journal on Scientific Computing, vol. 20, Issue 1 (1998) [retrieved on Feb. 12, 2018]. Retrieved from <http://citeseerx.ist.psu.edu/viewdoc/download?doi=10.1.1.48.447&rep=rep1&type=pdf>.*

Muske et al. "Lagrangian Solution Methods for Nonlinear Model Predictive Control" Proceedings of the American Control Conference (2000): Chicago, Illinois [retrieved on Feb. 12, 2018]. Retrieved from <http://ieeexplore.ieee.org/abstract/document/877020/>.*

Kelman et al. "Parallel Nonlinear Predictive Control" 50th Annual Allerton Conference: UIUC, Illinois, USA (2012) [retrieved on Feb. 12, 2018]. Retrieved from <http://ieeexplore.ieee.org/abstract/document/6483201/>.*

Shahzad et al. "Preconditioners for Inexact Interior Point Methods for Predictive Control" 2010 Americal Control Conference (2010): Baltimore, MD, USA [retrieved on Feb. 12, 2018]. Retrieved from <http://ieeexplore.ieee.org/abstract/document/5531146/>.*

Bruaset et al. "A Numerical Study of Optimized Sparse Preconditioners" BIT Numerical Mathematics (1994), vol. 34, Issue 2 [retrieved on Feb. 18, 2018]. Retreived from <https://link.springer.com/article/10.1007/BF01955867>.*

White et al. "Block-preconditioned Newton-Krylov solvers for fully coupled flow and geomechanics" Computational Geosciences (2011), vol. 15: doi 10.1007/s10596-011-9233-7 [retrieved on Feb. 12, 2018]. Retrieved from <https://link.springer.com/article/10.1007/s10596-011-9233-7/>.*

Axelsson "A General Incomplete Block-Matrix Factorization Method" Linear Algebra and Its Applications, vol. 74 (1986) [retrieved on Feb. 9, 2018]. Retrieved from <https://www.sciencedirect.com/science/article/pii/0024379586901217>.*

Yan "Sparse Preconditioned Iterative Methods for Dense Linear Systems" SIAM Journal on Scientific Computing, vol. 15, No. 5 [retrieved on Feb. 13, 2018]. Retrieved from <http://epubs.siam.org/doi/abs/10.1137/0915073>.*

Tanida et al. "Preconditioned C/GMRES Algorithm for Nonlinear Receding Horizon Control of Hovercrafts Connected by a String" 2004 IEEE International Conference on Control Applications [retrieved on Feb. 7, 2018]. Retrieved from <http://ieeexplore.ieee.org/abstract/document/1387606/>.*

Chen et al. "A two-level sparse approximation inverse preconditioner for unsymmetric matrices" IMA Journal of Numerical Analysis (2006), vol. 26, No. 1 [retrieved on Feb. 12, 2018]. Retrieved from <https://academic.oup.com/imajna/article-abstract/26/1/11/649548>.*

Jones et al. "An Improved Incomplete Cholesky Factorization" ACM Transactions on Mathematical Software, vol. 21, No. 1 [retrieved on Oct. 8, 2018]. Retrieved from <https://dl.acm.org/citation.cfm?id=200981> (Year: 1995).*

Ohtsuka, A Continuation/GMRES Method for Fast Computation of Nonlinear Receding Horizon Control., Automatica 40(4):563-574 • Mar. 2004.

* cited by examiner

US 10,209,685 B2

METHOD AND APPARATUS FOR PRECONDITIONED MODEL PREDICTIVE CONTROL

FIELD OF THE INVENTION

The invention relates generally to model predictive control, and more particularly to methods and apparatus for preconditioned model predictive control of dynamical systems.

BACKGROUND OF THE INVENTION

Model predictive control (MPC) is used in many applications to control complex dynamical systems. Examples of such systems include production lines, car engines, robots, other numerically controlled machining, and power generators.

The MPC is based on a real time finite horizon optimization of a model of a system. The MPC has the ability to anticipate future events, and to take appropriate control actions. This is achieved by optimizing the operation of the system over a future finite time-horizon subject to constraints, and only implementing the control over a current time step.

The MPC can predict the change in dependent variables of the modeled system caused by changes in independent variables. In a chemical process, for example, independent variables that can be adjusted by the controller are often pressure, flow, temperature, opening of the valves, and stiffness of dampers. Independent variables that cannot be adjusted by the controller are treated as disturbances. Dependent variables in these processes are other measurements that represent either control objectives or process constraints.

The MPC uses models of the system, the current system measurements, the current dynamic state of the process, and the process variable targets and limits to calculate future changes in the dependent variables. These changes are calculated to hold the dependent variables close to target subject to constraints on both independent and dependent variables.

The MPC numerical methods are implemented on various computational apparatus, often designed specifically for a given system. Computational apparatus can range from inexpensive fixed-point precision embedded controllers to sophisticated multi-core computer processor units (CPU), graphics processing unit (GPU), field-programmable gate array (FPGA), or dedicated parallel computer clusters.

Model predictive controllers rely on dynamic models of the process, most often linear empirical models, in which case the MPC is linear. Nonlinear MPC (NMPC), which describes systems with nonlinear models or constraints, is often more realistic, compared to the linear MPC, but computationally more difficult. Similar to the linear MPC, the NMPC requires solving optimal control problems on a finite prediction horizon, generally not convex, which poses challenges for obtaining a numerical solution in real time. The numerical solution of the NMPC optimal control problems is often based on Newton-type optimization schemes. Exact Newton-type optimization schemes require an analytic expression of a corresponding Jacobian matrix, which is rarely available in practice and is commonly replaced with a forward difference (FD) approximation. Such approximate Newton-type optimization schemes utilize the FD approximation of the original nonlinear equation during every time step of the control.

In an application to the NMPC, such an approximate Newton-type optimization can be performed by a Continuation NMPC (CNMPC) numerical method described by Ohtsuka, T., "A Continuation/GMRES Method for Fast Computation of Nonlinear Receding Horizon Control," Automatica, Vol. 40, No. 4, pp. 563-574, April 2004. One of the key repetitive and most computationally intensive steps in on-line calculations with CNMPC is numerical solution of a matrix equation $Ax=b$, where A is a coefficient matrix, x is a solution vector and b is a vector. The solution varies, from one time step of control to the next one, so do the coefficient matrix A and the vector b.

Entries of the solution vector x determine the output of the MPC method, which is used as an input control parameter for the system to control the system in real time. Therefore, there is a need for methods providing fast and accurate solution of the matrix equation $Ax=b$ appearing in various MPC implementations, e.g., on embedded hardware controllers using inexpensive processing units and limited amount of often slow memory, connected to the processing units.

The coefficient matrix A in the CNMPC is not explicitly given and available only via matrix-vector products. Specifically, a computer code is available to compute a product $A*X$, where A is the coefficient matrix, * is a matrix-matrix product, and X is a single column-vector, or several column-vectors assembled into a matrix. In this disclosure, the action of this computer code is referred to as an application of "a coefficient function." The coefficient function applied to a vector returns a product of the coefficient matrix and the vector. Internally, the coefficient function requires, e.g., evaluation of the state and costate equations by solving a number of differential equations, as described by Ohtsuka.

Because the coefficient matrix A is only available via the coefficient function, rather than in the matrix format, direct matrix solvers, requiring access to matrix entries, are not used in the CNMPC. Instead, so-called "matrix-free" iterative methods are used, which can operate having only the coefficient function without the coefficient matrix A. One conventional matrix-free iterative method for solving the matrix equation $Ax=b$ of the CNMPC is the generalized minimal residual (GMRES) method. The use of GMRES for the FD approximation of the nonlinear equation during every time step is commonly called FDGMRES, and can be interpreted as an inexact Newton's method. In the context of CNMPC, FDGMRES is named Continuation/GMRES (C/GMRES).

FDGMRES requires matrix-vector multiplications involving the coefficient function. The overall cost of computations is proportional to the maximal number of FDGMRES steps. Slow convergence of FDGMRES results in slowing down on-line computations of the control and reducing control quality obtained in real time calculations in the controller.

In CNMPC and many other MPC methods, e.g., based on interior-point approximations, on-line numerical solution of systems of linear equations can be main bottleneck limiting the number of states, constraints, horizon time, and other important MPC variables, thus, reducing applicability of MPC for difficult and fast practical systems. Accordingly, it is desired to increase efficiency and on-line performance of a model predictive control of a system developing preconditioners for iterative solution of the linear systems required for the controller in real time.

SUMMARY OF THE INVENTION

Model predictive control (MPC) is used in many applications. Some MPC methods, such as a continuation MPC (CMPC), determine a solution vector x of the control by repeatedly solving a matrix equation Ax=b with the varying coefficient matrix A and the right-hand side vector b. For each time step of the control, the MPC generates, from the solution vector x, a control action to control a system. Other similar examples include, e.g., MPC methods based on interior-point approximations or active-set methods.

Due to a potentially large size of the matrix A, relative to the computational resources of the controller, and the fact that individual entries of the coefficient matrix A may be not readily available, direct matrix-factorization based solvers for the matrix equation Ax=b are impractical. Thus, the matrix equation is solved iteratively, e.g., using an iterative method with a preconditioner matrix.

The preconditioned iterative method requires matrix-vector multiplications involving the coefficient matrix A, and the overall cost of computations is proportional to the maximal number of iterations. Due to the complexity of computation of the coefficient matrix A, its varying nature, and the necessity of only the matrix-vector multiplications, the iterative method does not need to use and even to explicitly determine the coefficient matrix entry-wise.

Instead, the iterative method may rely on a coefficient function a( ) that, when applied to a vector y, returns a product of the coefficient matrix A and the vector y, i.e., a(y)=A*y. The coefficient function is generated and used for each time step of the control in on-line implementation in real time. Internally, generating the formulas of the coefficient function may require, e.g., in CMPC, solving a number of differential equations.

Various embodiments of the invention are based on recognition that despite the complexity of computation of the coefficient matrix and the presence of the coefficient function, it can be beneficial to explicitly determine approximate values of some, but not necessarily all, entries of the coefficient matrix. This is because the coefficient matrix can be used to determine a preconditioner in the preconditioned iterative method to reduce a number of iterations. Because the computational complexity of the MPC is proportional to the maximal number of iterations, the preconditioner matrix according to some embodiments reduce the complexity of the MPC.

Various embodiments of the invention are based on another recognition that, for the purpose of the preconditioning, an entry of the coefficient matrix needs to be determined, but the determination does not have to be exact and can be approximated using an approximate coefficient matrix. In some MPC methods, e.g., in CMPC, the coefficient matrix is implicitly determined, using a coefficient function, but the coefficient function does not have to be exact, and can be approximated by an approximate coefficient function, for the purpose of the preconditioning. Using the coefficient function, even in the approximate form, for determining each entry of the coefficient matrix, preserves a framework for the entire coefficient matrix, and improves on-line real time performance to determine and apply the preconditioner matrix.

In addition, some embodiments are based on recognition that, when the coefficient matrix is known or constructed using the exact or approximate coefficient function, some entries on specific locations in the matrix are greater, and sometimes significantly greater, than entries on other locations. Moreover, such a pattern is repeatable for different calculations, interactions and types of the control system. Therefore, it is possible to determine off-line a map of locations identifying each location of an entry in the approximate coefficient matrix as either significant or insignificant, for the purpose of constructing the efficient preconditioner matrix Insignificant values can include zero and non-zero values. Some embodiments are based on recognition, that for purpose of determining the solution vector, the non-zero insignificant values are important. But, surprisingly, after a number of different tests and experiments, it was realized that presence or absence of those non-zero insignificant values for purpose of determining the preconditioner matrix have a minimal effect on convergence speed of the preconditioned iterative solver.

Accordingly, some embodiments of the invention determine or update entries of an approximate coefficient matrix only at locations identified in the map of locations as significant and determine the preconditioner matrix using the approximate coefficient matrix with a sparsity pattern determined by the map. Some embodiments of the invention also use matrix permuting patterns for ordering columns and rows and factorization methods of the preconditioner matrix, designed off-line specifically for the proposed map of the locations of the significant entries, resulting in low computational complexity of constructing and applying the preconditioning in on-line real time implementation of MPC.

Accordingly, one embodiment of the invention discloses a method for model predictive control (MPC) of a system. The method includes determining on-line entries of an approximate coefficient matrix only at locations identified in a map of locations as significant, wherein the entries are determined to approximate an exact coefficient matrix of the MPC, and wherein the map of locations identifies each location for an entry in the approximate coefficient matrix as either significant or insignificant; determining at least a part of a preconditioner matrix on-line using the approximate coefficient matrix, wherein the preconditioner matrix is sparse and different from a block diagonal matrix and different from a block tri-diagonal matrix; determining a solution vector on-line by solving a matrix equation of the MPC with the exact coefficient matrix using an iterative method with the preconditioner matrix; and generating a control signal on-line to control the system in real time using the solution vector. The steps of the method are performed by at least one processor.

Another embodiment of the invention discloses a model predictive controller for controlling a system according to a control signal generated at each time step, including a memory to store a model of the system, an approximate coefficient matrix and an exact coefficient matrix, and a map of locations identifying each location of an entry in an approximate coefficient matrix as either significant or insignificant; at least one processor determining a preconditioner matrix, wherein the preconditioner matrix is not a block (tri-)diagonal matrix, wherein the processor determines entries of the approximate coefficient matrix only at locations of the preconditioner matrix identified in the map of locations as significant, and wherein the processor solves a matrix equation with the exact coefficient matrix using an iterative method with a factorization of the preconditioner matrix to produce a solution vector of a system of equations with the exact coefficient matrix; and a controller generating the control signal for controlling the system using the solution vector.

DETAILED DESCRIPTION OF THE PREFERRED EMBODIMENT

Some embodiments of the invention provide a system and a method for controlling an operation of a system or a system according to a model of the system, using model predictive control (MPC).

Figure 1:
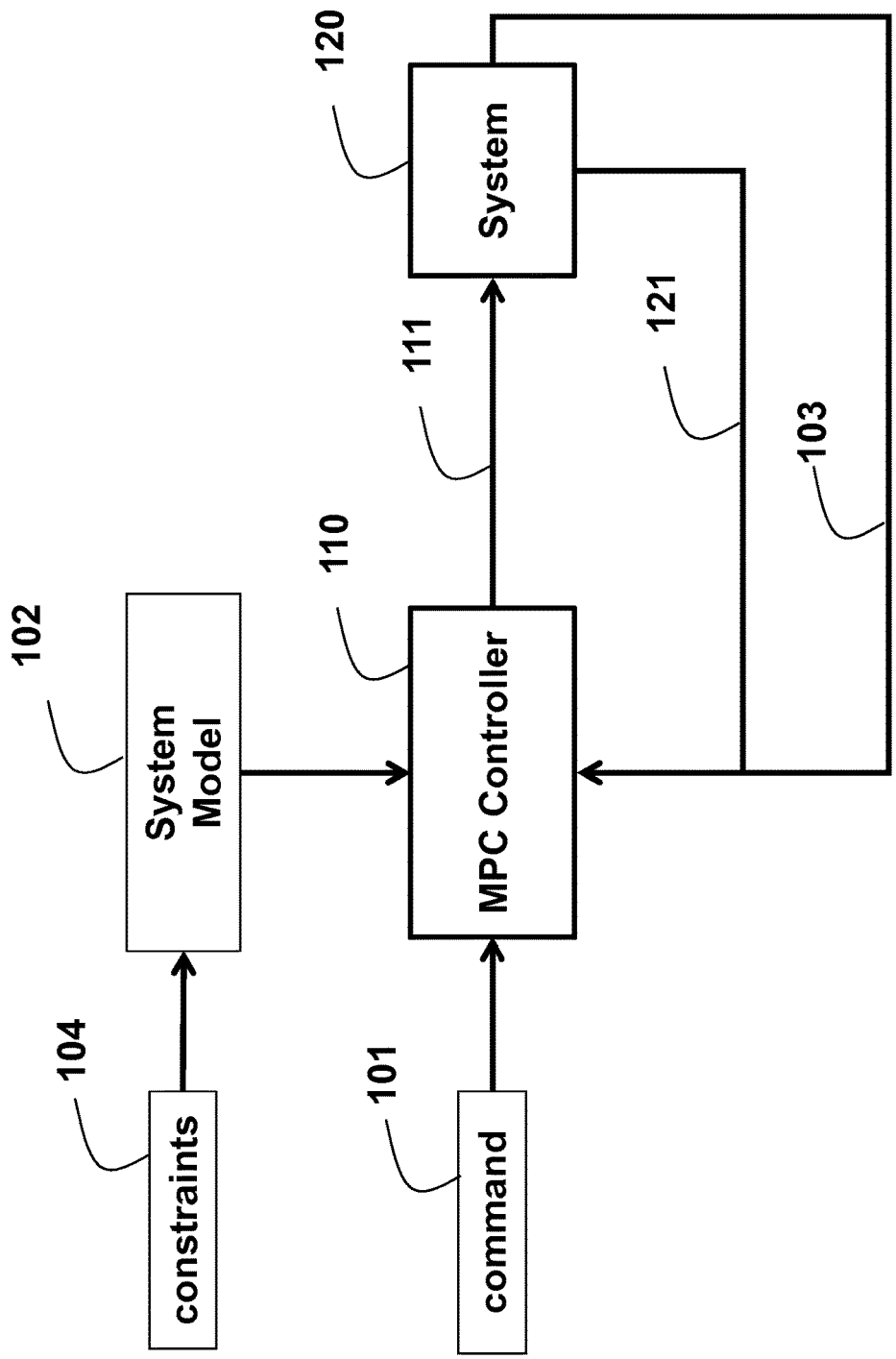
FIG. 1 is a block diagram of a controller and system according to embodiments of the invention.

FIG. 1 shows an example system 120 connected to an MPC controller 110. The controller 110 is programmed according to a model 102 of the system. The model can be a set of equations representing changes of the state 121 and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that servers as an input for the system. In response to the input, the system updates the output 103 and the state 121 of the system.

The system, as referred herein, can be any machine or device controlled by certain manipulation input signals (inputs), possibly associated to physical quantities such as voltages, pressures, forces, and to return some controlled output signals (outputs), possibly associated to physical quantities such as currents, flows, velocities, positions. The output values are related in part to previous output values of the system, and in part to previous and current input values. The dependency of previous inputs and previous outputs is encoded in the state of the system. The operation of the system, e.g., a motion of components of the system, can include a sequence of output values generated by the system following the application of certain input values.

A model of the system can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical and specification constraints limiting the range where the outputs, the inputs, and also possibly the states of the system are allowed to operate.

The controller can be implemented in a hardware or a software program executed in a processor, e.g., a microprocessor, which at fixed or variable control period sampling intervals receives the system outputs and the desired operation of the system motion, and determines, using these information, the inputs, e.g., the control signal 111, for operating the system.

Figure 2:
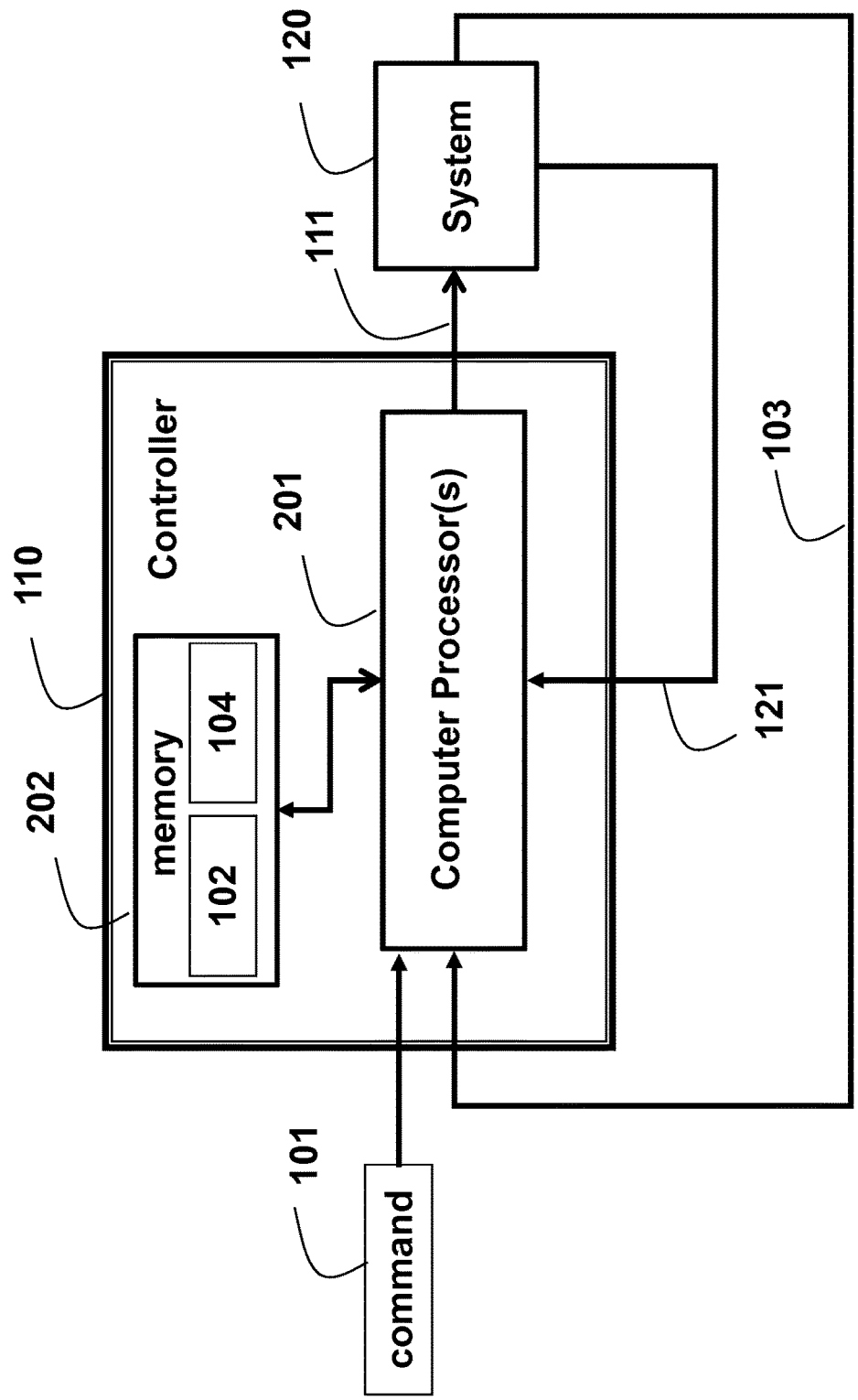
FIG. 2 is a block diagram of the controller according to embodiments of the invention.

FIG. 2 shows a block diagram of the controller 110 according embodiments of the invention that actuates the system so that the state 121 of the system and output 103 follow a command 101. The controller 110 includes a single computer processor unit (CPU) or multiple CPUs 201 connected to a memory 202 for storing the model 102 and the constraints 104 on the operation of the system. The controller actuates the system so that the system output and the state follow command 101.

Some embodiments provide a system and a method for a model predictive control (MPC) over a time horizon of a system, specifically, an MPC of a type that determines solution vector x containing changes in the control by repeatedly solving a matrix equation Ax=b, with varying coefficient matrix A and vector b. At each time step, the MPC generates, from the solution vector x, a control action to control a system. Some embodiments use nonlinear MPC (NMPC), which describes systems with nonlinear models. In those embodiments, the CMPC is actually CNMPC.

Figure 3A:
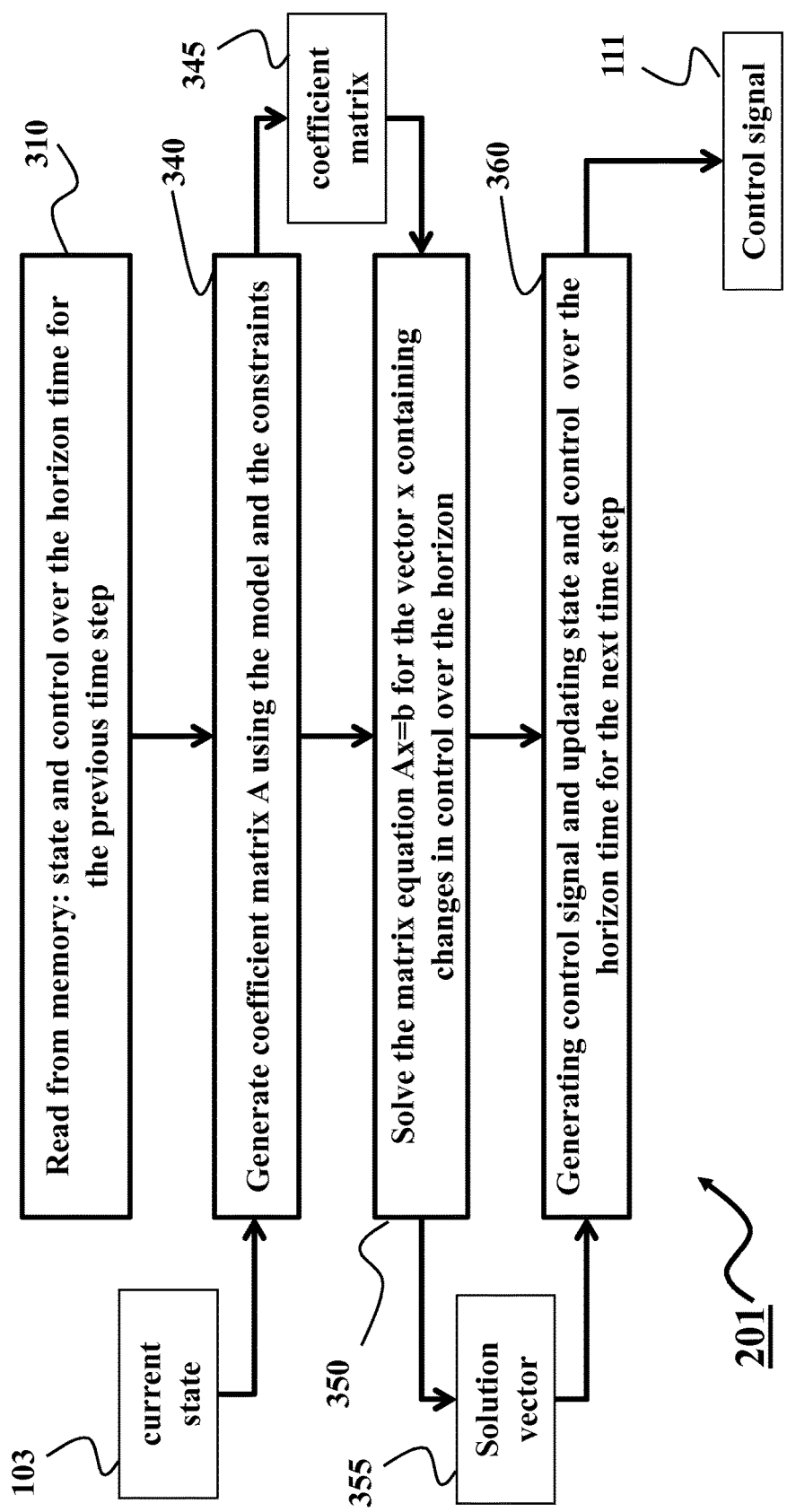
FIG. 3A is a block diagram of a model predictive control (MPC) method implemented on the controller according to embodiments of the invention.

FIG. 3A shows a block diagram of a method for an MPC of a system according to some embodiments of the invention. The method can be executed by computer processor(s)

201 of the controller 110 and/or using additional processors operating concurrently with the processor of the controller. In this example, the controller at a current time step of a control is activated by the measured state 121. The model 102 of the system and constraints 104 are stored in the memory 202 of the controller.

The method in FIG. 3A executes an on-line control step generating a control signal 111 for controlling the system based on the measured values of the current state 103 and the values 310 of state and control determined over the horizon time for the previous time step of the control. The method generates 340 the coefficient matrix 345 using the system model 102, the constraints 104, the command 101, the current state 103, and state and control from the previous time step, if available. The method solves 350, using the coefficient matrix 345, the matrix equation Ax=b for the vector x containing changes in the control signal over the horizon time to produce a solution vector 355 for the control signal 111. For solving 350, the coefficient matrix A 345 is determined 340 using the model and the constraints, as well as the current state 103. After the solution vector is determined, the method generates 360 the control signal 111 and updates the values of the state and the control over the horizon time. The updated values are then used by the method at the next time step of the control. In some embodiments, the method determines 360 the control for the entire time interval over the horizon time, but outputs only the control signal 111 for the nearest time step as prescribed by the MPC.

Some embodiments provide a system and a method for a continuation model predictive control (CMPC) of a system. The CMPC is a specific example of a type of MPC that determines solution vector x of the control by repeatedly solving a matrix equation Ax=b of the CMPC, with the varying coefficient matrix A and vector b. At each time step, the CMPC generates, from the solution vector x, a control action to control a system. Some embodiments use nonlinear MPC (NMPC), which describes systems with nonlinear models. In those embodiments, the CMPC is actually CNMPC.

Figure 3B:
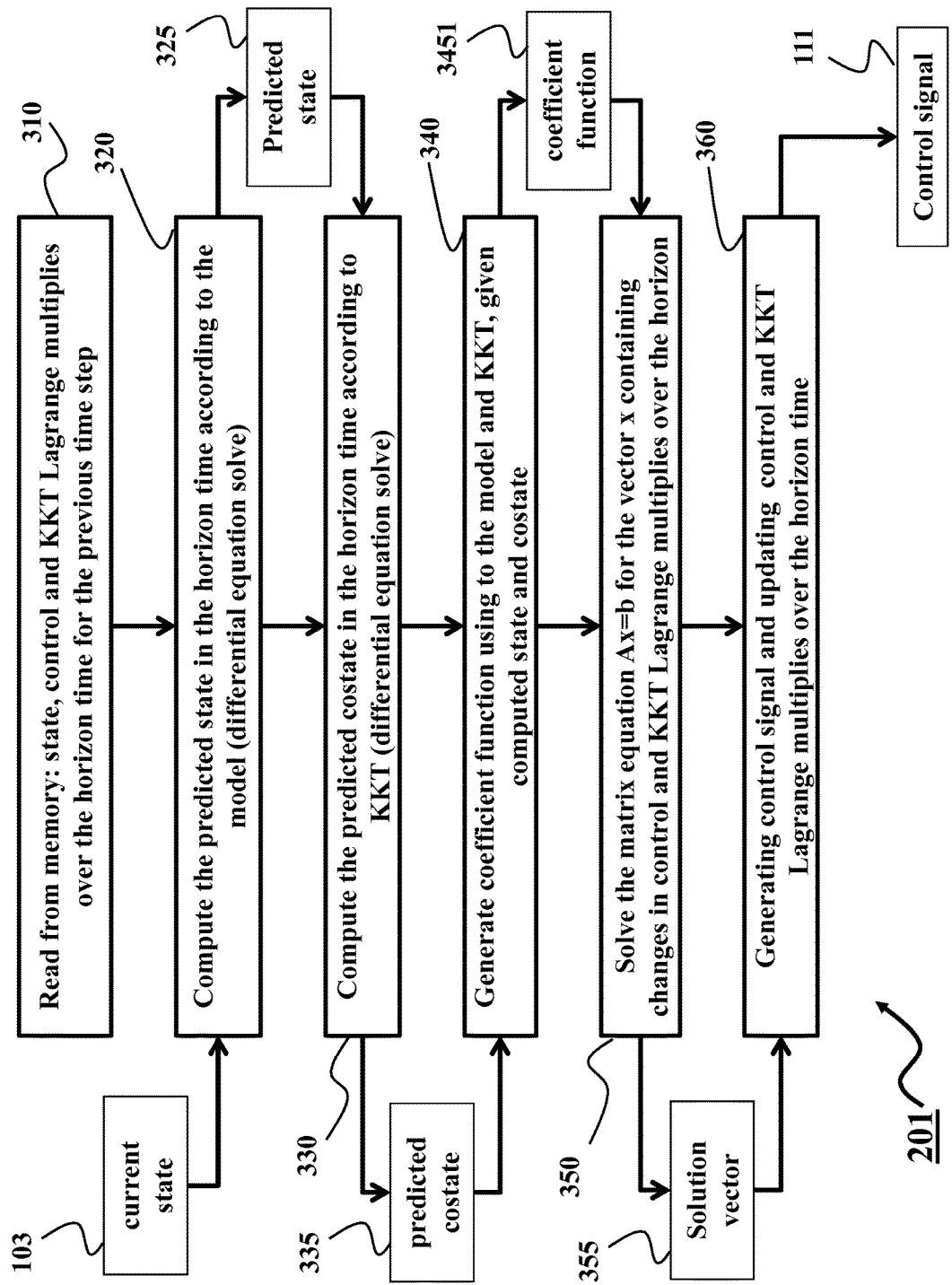
FIG. 3B is a block diagram of a method for a continuation MPC (CMPC) of a system according to one embodiment of the invention.

FIG. 3B shows a block diagram of a method for a continuation model predictive control (CMPC) of a system according to some embodiments of the invention. The method can be executed by computer processor(s) 201 of the controller 110 and/or using additional processors operating concurrently with the processor of the controller. In this example the controller at a current time step t of a control is activated by the measured state 121. The model 102 of the system and constraints 104 are stored in the memory 202 of the controller.

The method in FIG. 3B executes an on-line control step generating a control signal 111 for controlling the system based on the measured values of the current state 103 and the values 310 of state, control, Lagrange multiplies determined over the horizon time for the previous time step of the control.

For example, the method determines 320 the predicted state 325 in the horizon time according to the model of the system by solving a differential equation using values 103 and 310, and determines 330, from the predicted state 325, a predicted costate 335 in the horizon time according to the Karush-Kuhn-Tucker (KKT) necessary optimality conditions.

The method generate 340 the coefficient function 3451 using the model, the Lagrange multiplies, the state 325 and costate 335, and the values 310. The method solves 350, using the coefficient function 3451, the matrix equation Ax=b with the coefficient matrix A 345 for the vector x containing changes in the control signal and Lagrange multiplies over the horizon time to produce a solution vector 355 for the control signal 111. For the solution 350, the coefficient matrix A 345 is implicitly given by the coefficient function 3451. After the solution vector 355 is determined, the method generates 360 the control signal 111 and updates 360 the values of the state, the control and the Lagrange multiplies over the horizon time. The updated values are used by the method at the next time step of the control.

In some embodiments, the method determines 360 the control for the entire time interval over the horizon time, but outputs only the control signal 111 for the nearest time step as prescribed by the MPC.

Due to the complexity of computing of the coefficient matrix A, its varying nature, and the necessity of matrix-vector multiplications, the MPC usually does not use and may not even explicitly determine the coefficient matrix A 345 entry-wise. Instead, the MPC relies on the coefficient function 3451. The coefficient function a(x) 3451, applied to a vector y, returns a product of the coefficient matrix A 345 and the vector y, i.e., a(y)=A*y. Internally, the generation 340 of the formulas of the coefficient function 345 may require solving 320 differential equations for the state 325 and then solving 330 for the costate 335, for example, in CMPC.

Various embodiments of the invention solve the matrix equation Ax=b, wherein the coefficient matrix A 345 is defined by the coefficient function 3451. Due to a potentially large matrix size, relative to the computational resources of the controller, and the fact that individual entries of the coefficient matrix A 345 may be not readily available, classical direct matrix-factorization based solvers for the matrix equation Ax=b are considered impractical. The MPC thus involves solving the matrix equation Ax=b with the coefficient matrix A 345 iteratively, e.g., using a preconditioned iterative method, such as a preconditioned generalized minimal residual (GMRES) method. Accordingly, some embodiments of the invention solve the matrix equation using an iterative method with a preconditioner matrix.

Let T be a preconditioner for the matrix A. The system of linear equations Ax=b can be solved by the preconditioned stationary iteration method $x_{n+1}=x_n+T(b-Ax_n)$. The stationary iteration can be accelerated by Krylov subspace methods such as the preconditioned minimal residual method, the preconditioned generalized minimal residual method and the preconditioned gradient method, which search for best approximations to the solution in the form $x_n=x_0+y_n$, where the vector $y_n$ belongs to the Krylov subspace spanned by the vectors $A^k(b-Ax_0)$, k=0, 1, . . . , n-1. Other accelerated iterations include the Chebyshev and Nesterov methods approximating the solution by special polynomial representations $x_n=x_0+p_n(A)(b-Ax_0)$, where $p_n(A)$ is either the Chebyshev or Nesterov polynomial of degree n.

Some embodiments of the invention are based on recognition that despite the complexity of computation of the coefficient matrix A 345 and the presence of the coefficient function, it can be beneficial to explicitly determine at least some entries the coefficient matrix A 345 itself. This is because the coefficient matrix A 345 can be used to determine a preconditioner in the preconditioned iterative method to reduce a number of iterations. Because the computational cost of CMPC is proportional to the maximal number of iterations, the usage of the preconditioner determined based on the coefficient function can reduce the cost of the CMPC.

Some embodiments of the invention are based on another recognition that, for the purpose of the preconditioning, each entry of the coefficient matrix can be determined using a coefficient function, but the coefficient function does not have to be exact, and can be an approximate coefficient function. Using a coefficient function, even in the approximate form, for determining each entry of the coefficient matrix preserves a framework of the CMPC across the entire coefficient matrix and approves a quality of the coefficient matrix used to determine a preconditioner. Additionally or alternatively, the approximate coefficient function can be used to determine the preconditioner even without explicitly determining the entries of the coefficient matrix.

Figure 4A:
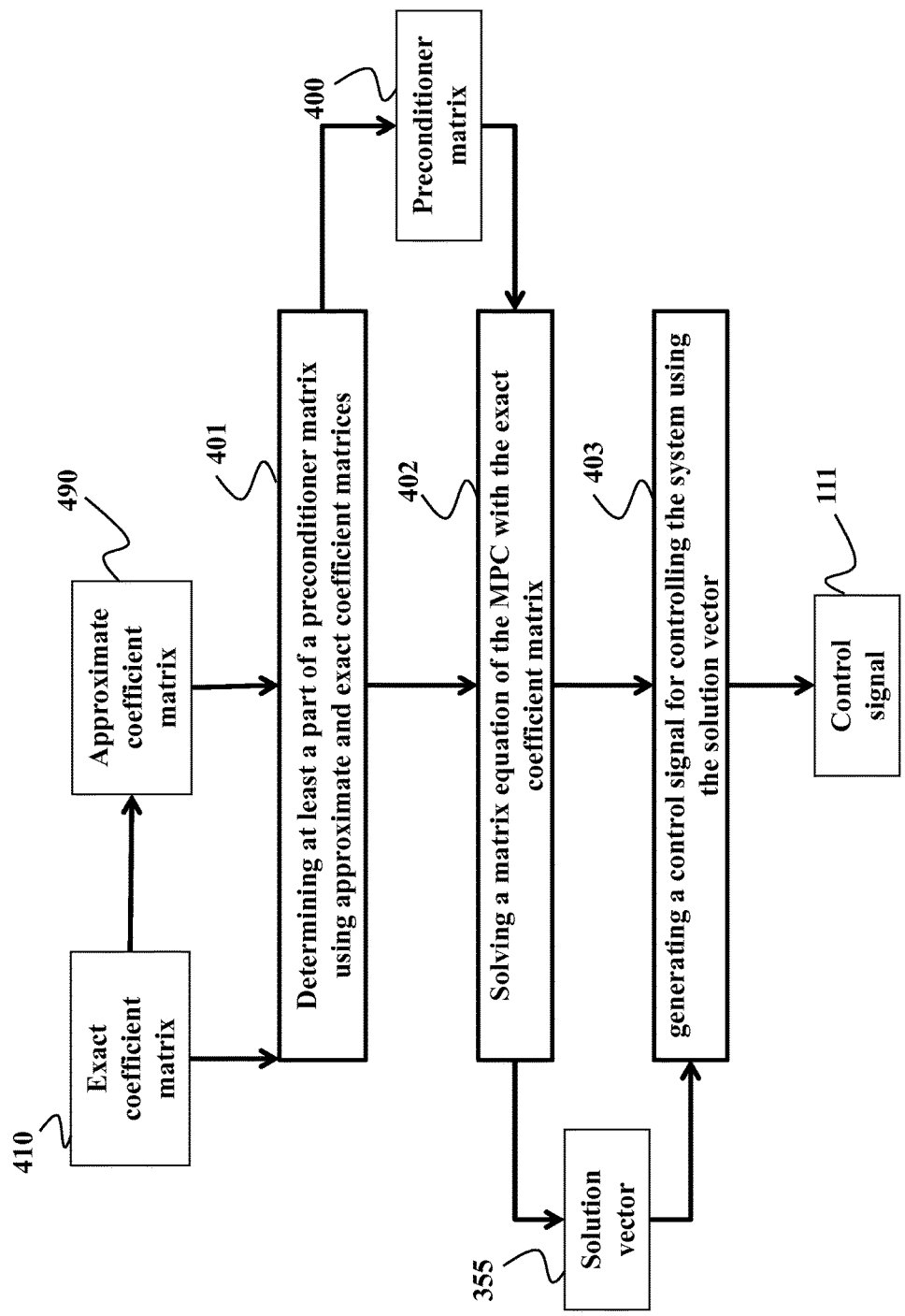
FIG. 4A is a block diagram of a method of determining and using a preconditioner matrix for solving the matrix equation of the MPC according to some embodiments of the invention.

FIG. 4A shows a block diagram of a method for a model predictive control (MPC) of a system according to one embodiment of the invention. The embodiment determines 401 at least a part of a preconditioner 400 using one or a combination one or a combination of the exact coefficient matrix 345 and the approximate coefficient matrix 490, wherein the preconditioner matrix is sparse and different from block (tri-) diagonal, and then determines 402 a solution vector 355 by solving a matrix equation of the CMPC with the exact coefficient matrix 345 1 at a current time step of a control using the preconditioner matrix. The embodiment generates 403 a control signal 111 for controlling the system using the solution vector 355.

As used herein, the exact coefficient matrix 410 is the coefficient matrix 345 used by a controller to determine 350 a solution vector 355 of the control at a current time step of the control. Any other coefficient matrix is approximate. For example, the approximate coefficient matrix 490 can be determined as a different exact coefficient function 410 determined for a different time step of the control; or a coefficient matrix determined using an arithmetic having a precision lower than a precision of arithmetic for determining the exact coefficient matrix. Entries of the approximate coefficient matrix 490 approximate entries of the exact coefficient matrix 410.

Figure 4B:
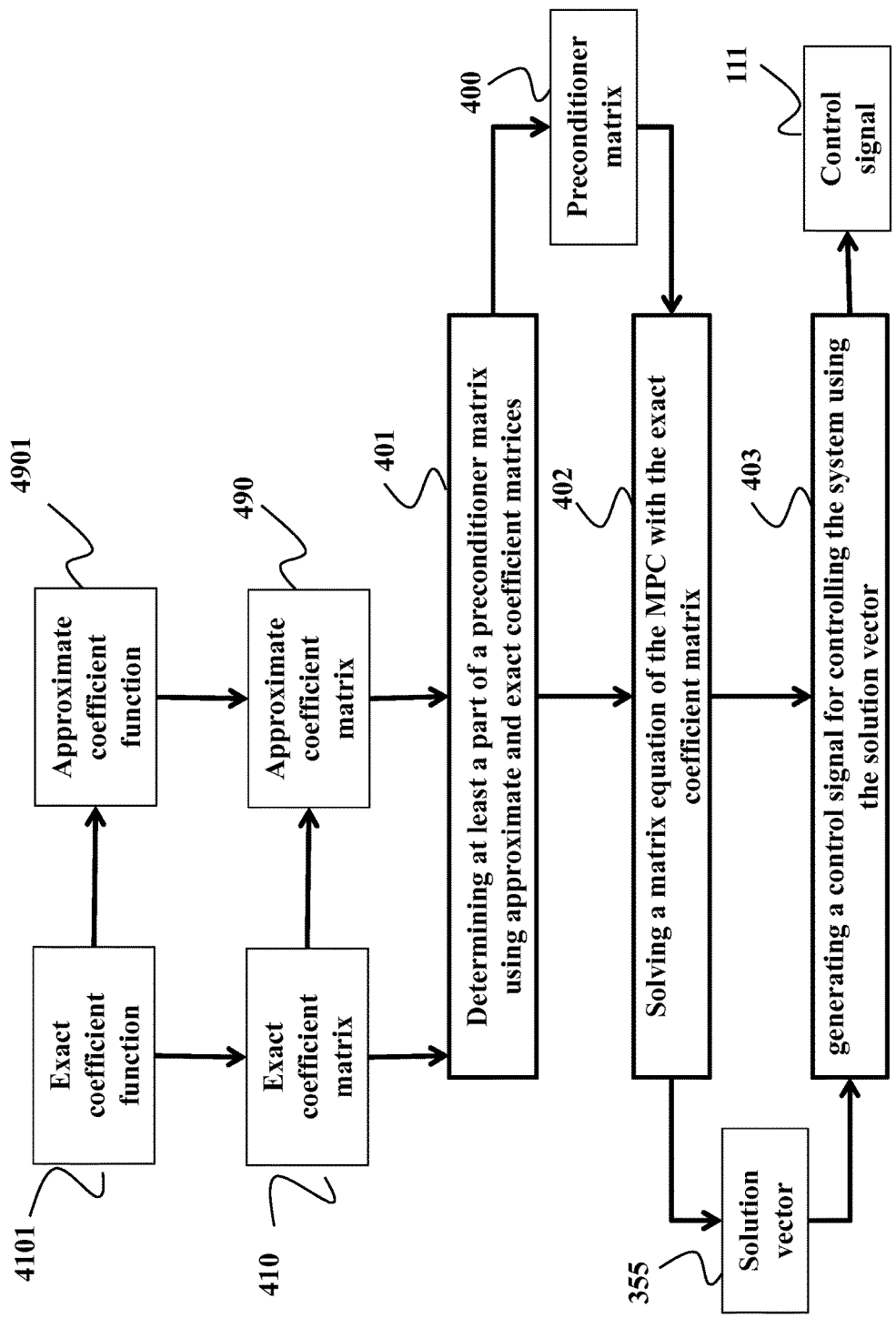
FIG. 4B is a block diagram of a method of determining and using a preconditioner function for solving the matrix equation of the MPC according to some embodiments of the invention.

FIG. 4B shows a block diagram of a method for a continuation model predictive control (CMPC) of a system according to one embodiment of the invention, wherein the exact coefficient function 4101 and the approximate coefficient function 4901 determine the exact coefficient matrix 410 and the approximate coefficient matrix 490. The embodiment determines 401 at least a part of a preconditioner 400 using one or a combination one or a combination of the exact coefficient matrix 410 and the approximate coefficient matrix 490, and then determines 402 a solution vector 355 by solving a matrix equation of the CMPC with the exact coefficient matrix 410 defined by an exact coefficient function 4101 at a current time step of a control using an iterative method with the preconditioner matrix 400. The embodiment generates 403 a control signal 111 for controlling the system using the solution vector 355.

As used herein, the exact coefficient function 4101 is the coefficient function used by a controller to determine a solution vector of the control at a current time step of the control. Any other coefficient function is approximate. For example, the approximate coefficient function 4901 is a different exact coefficient function determined for a different time step of the control; or a coefficient function determined using an arithmetic having a precision lower than a precision of arithmetic for determining the exact coefficient function; or a coefficient function determined using a simplified solver for differential equations.

Notably, the approximate coefficient function applied 4901 to a vector approximates a result of application of the exact coefficient function 4101 to the vector. Specifically, the approximate coefficient function 4901 applied to a vector returns a product of the approximate coefficient matrix 490 and the vector, wherein the exact coefficient function 4101 applied to a vector returns a product of the exact coefficient matrix 410 and the vector, for the current time step of the control.

Determining at least part of the preconditioner 400 using the approximate coefficient function provides flexibility in determining the individual entries of the coefficient matrix 345 and/or preconditioner 400 and allows partitioning the determination of different parts of the preconditioner in space, in time and/or in quality. This is because the usage of one or combination of the approximate 4901 and the exact 4101 coefficient functions allows determining different entries of the same coefficient matrix 345 at different time steps of the control, on different processors, and with different accuracy, while still preserving the framework of the CMPC for determining the preconditioner.

Figure 4C:
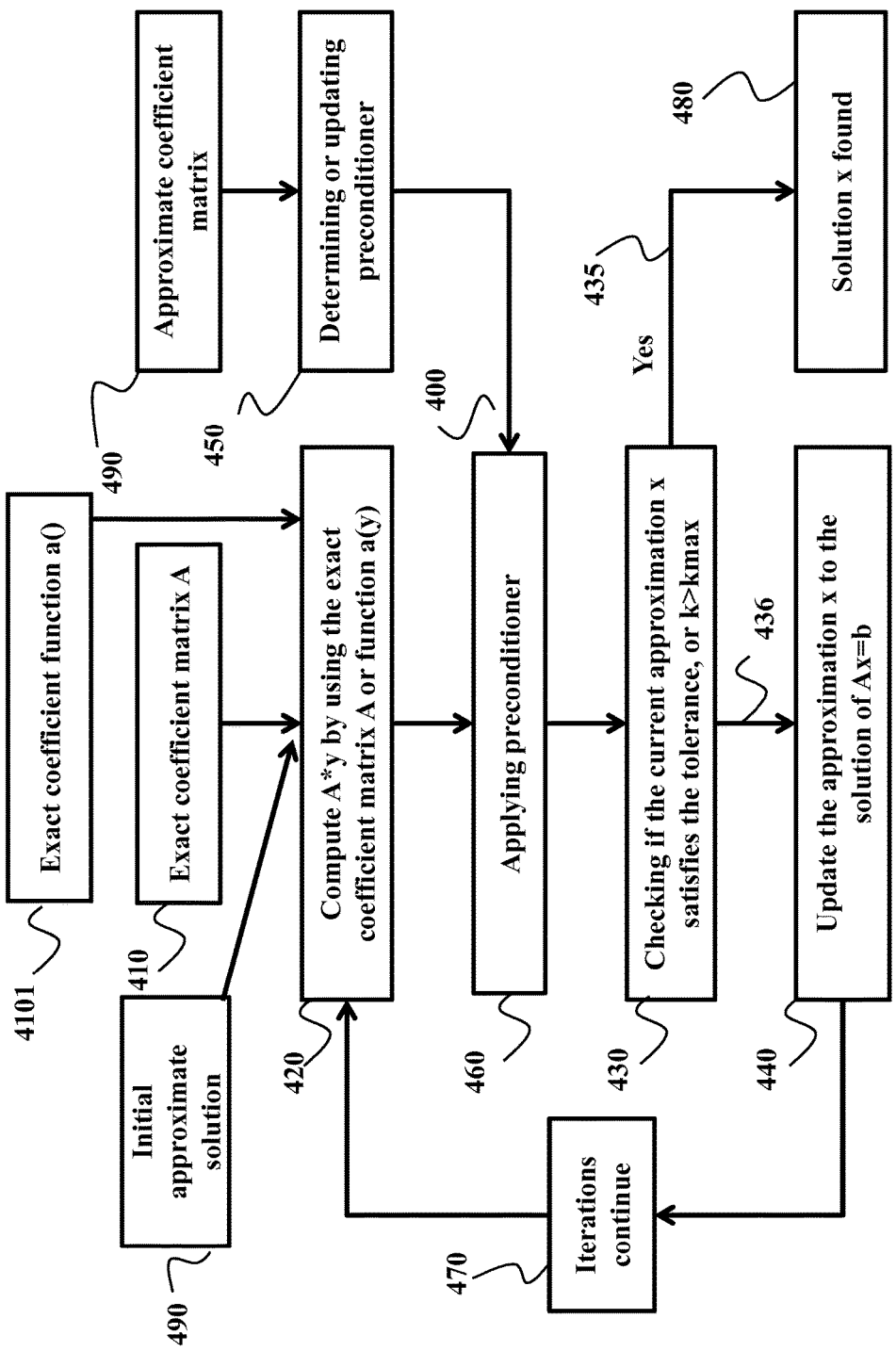
FIG. 4C is an example of a preconditioned iterative solver for the matrix equation according to some embodiments of the invention.

FIG. 4C shows an example of a preconditioned iterative method for solving the matrix equation Ax=b of the MPC with a coefficient matrix 345, defined as the exact coefficient matrix A 410, and the exact coefficient function 410 according to one embodiment of the invention. An example of the iterative method is a preconditioned generalized minimal residual (GMRES) method.

The exact coefficient function 4101 is determined for each current time step of the control. Alternatively or additionally, the exact coefficient matrix 410 is determined for each current time step. Also, an initial approximation of a solution vector x is determined. For example, a zero vector or a solution vector determined at the previous time step of the control are some possible choices.

The iterative method of the MPC requires matrix-vector multiplications 420 A*y using the exact coefficient matrix A or involving the exact coefficient function a(y) on every iteration, wherein the vector y can be a current approximation x to the solution Ax=b. The overall cost of computations is proportional to the maximal number of iterations. A stopping criterion 430 checks if the current approximation x satisfies a given tolerance, or the maximum number of iterative steps $k_{max}$ is reached. If the stopping criterion is met 435, the iterations are stopped, outputting the current approximation to the vector x as an approximate solution 480 of the matrix equation Ax=b. If the stopping criterion is not met 436, an updated approximation 440 to the solution is computed and the iterations continue with a cycle to step 420, increasing 470 by one the iteration index k.

Some embodiments determine or update 450 at least a part of a preconditioner matrix 400 using an approximate coefficient matrix 490. The preconditioner can first be generated and then applied, e.g., on every step of the main iterative cycle. In some embodiments, the preconditioner matrix is related to a preconditioning function t( ), generated 450 outside of the main iterative cycle, wherein the preconditioning function t(x)=T*x applied to a vector returns a product T*x of a matrix inverse T of the preconditioner matrix on the vector x.

The preconditioner can be applied 460, e.g., during every step of the main iterative cycle. The preconditioner application 460 can for example mean that a preconditioner function t( ) acts on the residual b−Ax, i.e., determines t(b−Ax). Application of the preconditioning accelerates the convergence of the iterative method without significantly increasing the computational costs per iteration, thus, leading to an overall improved performance of the controller.

If an approximate inverse of an approximate coefficient matrix A is used for the matrix form T 450 of the preconditioner, i.e., $T \approx A^{-1}$, the number of iterations in the preconditioned iterative method is radically reduced. In an exact case, where the preconditioner T at a given time step coincides with the inverse of the exact coefficient matrix 410, i.e., $T=A^{-1}$, the number of iterations in the preconditioned method is reduced to one. However, the exact case can be computationally expensive, thus, some embodiments of the invention are based on a recognition that, for the purpose of the preconditioning update or setup 450 and application 460, an approximate coefficient matrix (and/or the approximate coefficient function) 490 can be easier and faster to generate and apply, compared to their exact counterparts, while still can lead to high-quality preconditioning.

For example, one embodiment determines the approximate coefficient function using an arithmetic having a precision lower than a precision of an arithmetic for determining the exact coefficient function. This embodiment is based on realization that constructing and updating the coefficient matrix A for the purpose of determining the preconditioner T does not require full accuracy and can be done using a reduced number of arithmetic bits on the computer-based controller. Additionally or alternatively, another embodiment is determining the preconditioner T in the low precision arithmetic from the already computed approximate coefficient matrix function or the approximate coefficient matrix.

For example, in a mixed-type computing environment, having a conventional computer processing unit (CPU) with double arithmetic precision and a GPU with a single arithmetic precision, the calculation of the control can be performed on the CPU in double precision, while the preconditioner update or setup 450 can be performed on the GPU in single precision, including parallel calculation of the approximate coefficient matrix A.

Additionally or alternatively, another embodiment determines the approximate coefficient function using a simplified solver for differential equations, wherein the simplified solver is faster, but less accurate than a solver for determining the exact coefficient function. For example, a solver for solving the differential equations in steps 320 and 330 can use a larger size, compared to the initial grid, possibly non-uniform, in the time and/or space domain of the solver for determining the approximate coefficient function. This can increase the speed of on-line computations, while the resulting reduced accuracy only affects the preconditioner update or setup 450, not the accuracy of the actually computed solution 480 and the control signal 111.

Additionally or alternatively, another embodiment determines the approximate coefficient matrix 490 or function 4901 for the preconditioner update or setup 450 using a simplified approximate model 102 of the system. This embodiment approximates the model of the system used for determining the exact coefficient function and determines the approximate coefficient function using the approximate model of the system. Examples of such model approximation and/or simplification include, but are not limited to, one or a combination of linearizing the NMPC, using smaller than the original horizon time, and simplifying the constraints.

Some embodiments are based on another realization that the coefficient function 4101 $a(\ )$ and thus the coefficient matrix 410 A can change at every time step, but the change is often moderate, e.g., because the consecutive optimal control problems in NMPC can be similar to each other.

Figure 5:
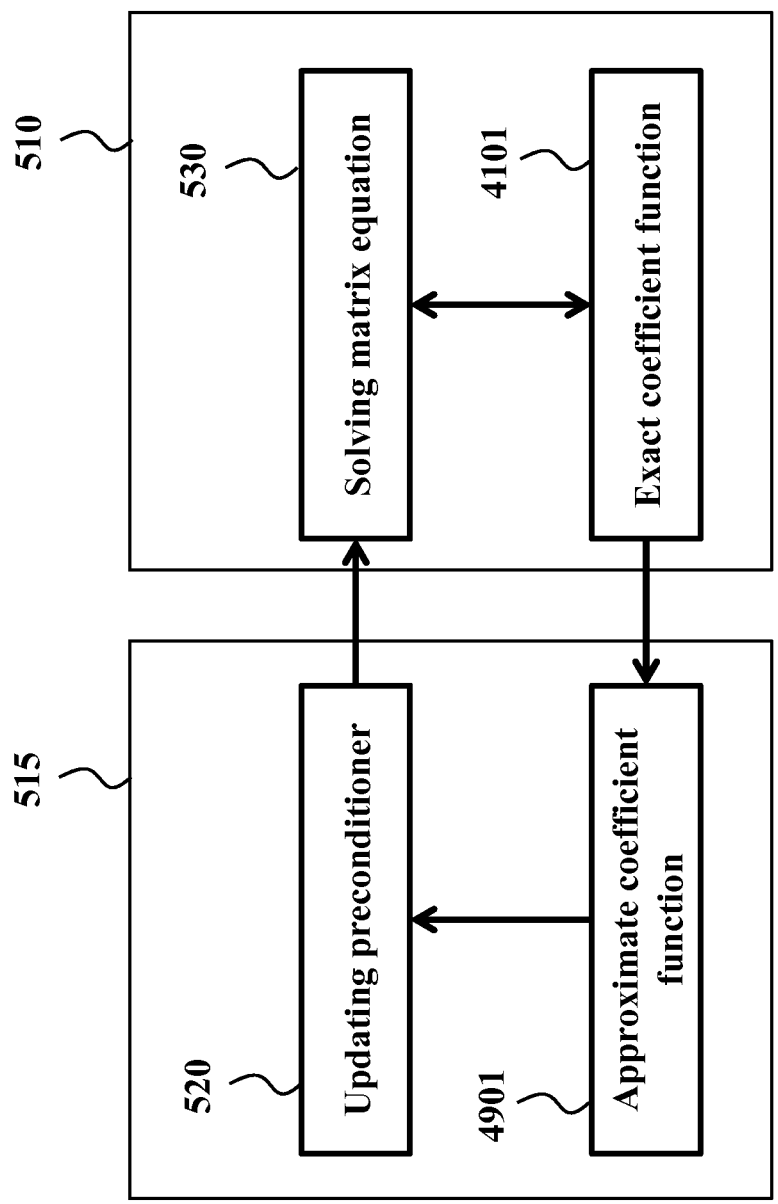
FIG. 5 is a block diagram of an asynchronous concurrent preconditioner setup according to some embodiments of the invention.

FIG. 5 shows a block diagram of a method for updating previously determined preconditioner according to some embodiments of invention. For example, the coefficient function used for solving 530 the matrix equation is the exact coefficient function 4101. However, in the next time step of control, the exact coefficient function becomes the approximate coefficient function 4901 and can be used for updating 520 the preconditioner. In some embodiments, the update 520 is done asynchronously, e.g., in parallel, with the solving 530. For example, if the solving is performed by a processor 510, the update 520 is performed by one or multiple different processors 515. Other embodiments are based on realization that the preconditioner can be determined or updated asynchronously and concurrently with (i.e., in parallel to) the execution of the iterative solver for $Ax=b$, for example on an additional CPU or GPU.

In some embodiments, the approximate coefficient function 4901 updates 520 only a part of the preconditioner. The update is performed repeatedly at different time steps of control. Thus, this embodiment determines the preconditioner using multiple approximate and/or exact coefficient functions, as well as multiple preconditioners. The update allows to partition the determination of preconditioner in time, by using different coefficient function determine at different times, and in space, by updating same or different parts of the preconditioner using additional processors.

Some embodiments determine the preconditioner based on a coefficient matrix determined using one or combination of the approximate and exact coefficient functions. For example, if the coefficient matrix is determined exactly on every time step to set up the preconditioner, the number of iterations in the preconditioned iterative method can be reduced to one. When the coefficient matrix is only approximate for the purpose of the preconditioner setup, the number of iterations can be greater than one, but still may be smaller as compared with the conventional case without preconditioning. Accordingly, some embodiments provide a trade-off between the cost of calculations of the exact version of the coefficient function for the purpose of determining the preconditioner and the reduction of the number of iterations in the preconditioned iterative method.

For example, one embodiment reuses the preconditioner, determined from the exact coefficient matrix A for a previous time step, for several subsequent time steps. At these subsequent time steps the exact coefficient matrix A may change, so the preconditioner becomes determined from the approximation to the current exact coefficient matrix A. This embodiment can monitor the preconditioner quality and recalculate the preconditioner, when its quality drops. For example, the embodiment can recalculate the preconditioner when a rate of convergence of the preconditioned iterative method is below a threshold.

Alternatively, one embodiment reuses for several subsequent time steps the preconditioner, determined from the coefficient matrix computed for a predicted future state a few time steps ahead of the current time. This embodiment is based on a realization that the MPC process calculates controls and predicted future states within the horizon time. The MPC outputs only the next time step control to the system, discarding all other calculated quantities, but they can be used for the determining the preconditioner. In another embodiment, the preconditioner is determined using the preconditioners from different time steps of the control, for example, using extrapolation.

Some embodiments stop the iterative method to update the preconditioner. For example, the iterative method can be stopped at some iterative step, and then restarted using the current iterative approximation to the solution as an initial approximation for the restarted method, with a newly recalculated or updated preconditioner. In this case, the preconditioner is fixed during the process of iterations between the restarts.

Alternative embodiment uses the recalculated or updated preconditioner in an iterative solver without the restart, leading to a variable preconditioner, i.e., the preconditioner that may change on every iteration. Thus, embodiments are modified to use flexible iterative methods that allow variable preconditioning, such as flexible generalized minimum residual (PGMRES), preconditioned minimal residual (PMINRES), or preconditioned conjugate gradient (PCG) methods.

Additionally or alternatively, one embodiment is based on recognition that usually the iterative methods that start at the given time step, does not use any information, apart possibly from the initial approximation to the solution, from the previous time step(s). Because this information may be valuable to accelerate the convergence, this embodiment does not restart the iterative method between the time steps, but rather keeps running the iterations with the updated coefficient matrix A (given by the updated coefficient function) and the updated vector b. This embodiment uses iterative methods that are flexible not only to variable preconditioning, but also to updated coefficient matrix A and the vector b.

Some embodiments of the invention determine the preconditioner approximating at least some of the entries of the exact coefficient matrix A stored in controller memory. In applications when the entries of the coefficient matrix A are not originally explicitly available, e.g., in CMPC, some embodiments determine each entry of the approximate or exact coefficient matrix. For example, one embodiment determines each entry of an approximate coefficient matrix using one or combination of the approximate coefficient function and the exact coefficient function, and determines the preconditioner using the approximate coefficient matrix.

One embodiment determines on-line entries of an approximate coefficient matrix only at locations identified in a map of locations as significant, and wherein the map of locations identifies each location of an entry in the approximate coefficient matrix as either significant or insignificant.

Furthermore, another embodiment determines the map of significant locations off-line, wherein a location mapped as not significant is determined by one or a combination of an analytical derivation and numerical simulation by checking whether annulling an entry of the approximate coefficient matrix at the location in the preconditioner matrix maintains a convergence speed of the iterative method with the preconditioner matrix larger than a predefined first threshold. The analytical derivation and numerical simulation of checking whether annulling the entry of the approximate coefficient matrix at the location in the preconditioner matrix maintains the convergence speed of the iterative method may require determining off-line the entire exact coefficient matrix 410 for the on-line control.

Alternatively, or additionally, a different embodiment determines the map of significant locations off-line, wherein the significant locations are determined as locations of the largest by absolute value entries of the approximate coefficient matrix, and wherein the number of the non-zero entries identified as significant by the map of locations is determined by one or a combination of a predefined fraction of the total number of entries of the approximate coefficient matrix and a predefined second threshold bounding below the absolute values of the significant entries of the approximate coefficient matrix. Determining the locations of the largest by absolute value entries of the approximate coefficient matrix numerically can be performed by determining off-line the entire exact coefficient matrix 410 for the on-line control.

Figure 6:
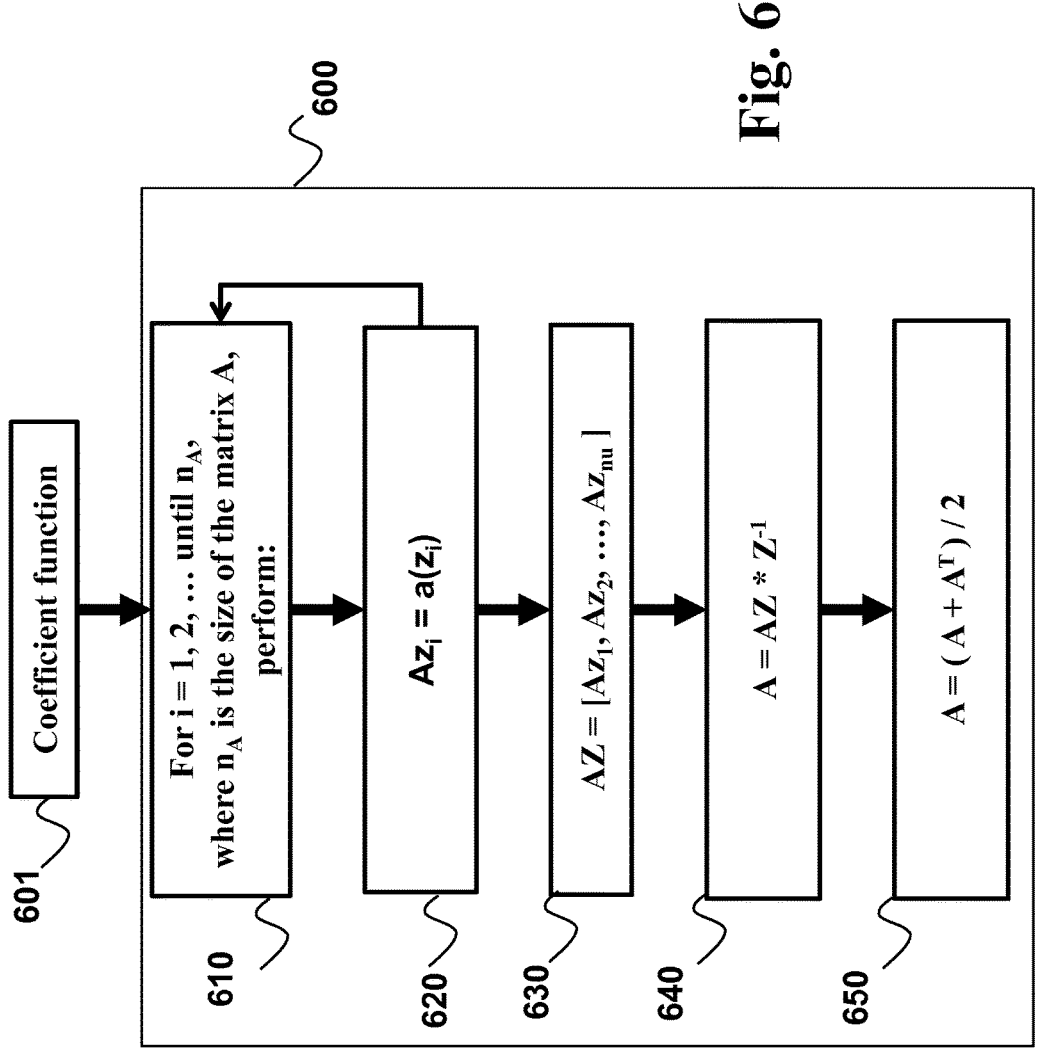
FIG. 6 is a diagram of an embodiment of the invention that determines the coefficient matrix by applying the coefficient function to vectors concurrently according to an embodiment of the invention.

FIG. 6 shows a flow chart of an embodiment of the invention that determines 600 the coefficient matrix by applying the coefficient function a( ) 601 to coordinate vectors $e_i$, i.e., the columns of the identity matrix I, or to columns $z_i$ of any full-rank matrix Z of a size of the coefficient matrix A. The coefficient function 601 is the exact or the approximate coefficient function.

For example, some embodiments concurrently 610 apply 620 the coefficient function 601 to each of the vectors $z_i$ to obtain a matrix AZ 630. The embodiments determine 640 the coefficient matrix A, either exact or approximate, by multiplying the matrix AZ with the inverse of the matrix Z on the right. In some variations, the matrix Z is the identity, Z=I. In those variations the multiplication 640 is not needed.

If the coefficient matrix A is properly formulated, then the coefficient matrix is symmetric. Thus, some embodiment determine only the upper or lower triangular part of the coefficient matrix A. In some of the embodiments, nevertheless, the complete coefficient matrix A is computed for convenience or speed.

In some implementations of the controller, the computed complete coefficient matrix A may not be exactly symmetric, which can lead to numerical inaccuracies in preconditioning and the iterative method. Hence, one embodiment makes the coefficient matrix exactly symmetric by replacing 650 the coefficient matrix with its symmetric average $(A+A^T)/2$. Because the computations 620 in the loop 610 are entirely independent from each other, this embodiment can take advantage of multi-thread (parallel) computations using multiple processors, e.g., GPU or FPGA. Thus, the embodiment can determine the elements of the coefficient matrix in parallel, which increases the computational efficiency.

Figure 7:
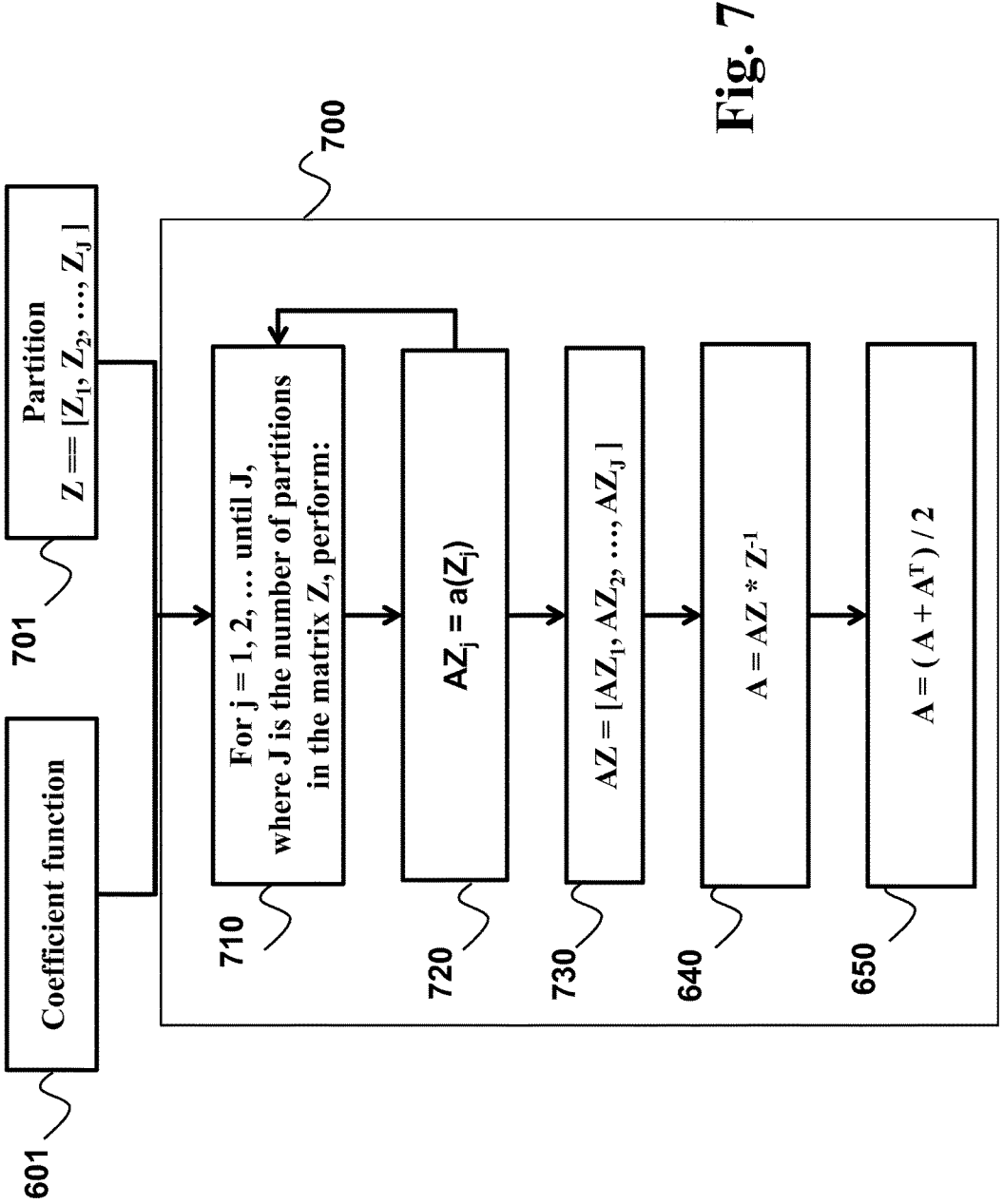
FIG. 7 is a diagram of another embodiment applying the coefficient function to blocks of vectors.

FIG. 7 shows a flow chart of an embodiment of the invention that determines 700 the coefficient matrix by applying the coefficient function $a(Z_j)$ to a block of vectors Z, rather than to a single vector a(z), on the same processor. The matrix Z, used here to generate the coefficient matrix A from the coefficient function 601, needs to be a priori partitioned 701 into blocks of its columns $Z_j$. If every block includes only a single column, the embodiment of FIG. 7 is similar to the embodiment of FIG. 6. Otherwise, the steps 710, 720, and 730 generalize the steps 610, 620, and 630. In some variations, the matrix Z is the identity, Z=I. In those variations the multiplication 640 is not needed.

Applying the coefficient function to a block of vectors on the same processor allows one embodiment to utilize high level Basic Linear Algebra Subprograms (BLAS), or their similar alternatives. BLAS are a set of low-level kernel subroutines that perform common linear algebra operations with vectors and matrices. High level BLAS, i.e., BLAS level 2 and 3, are especially intended to improve performance of programs using BLAS on vector processors with data and instruction pipelining, internal multi-threading using several functional units, and multi-level internal cache memory. In some embodiments, partitioning of the matrix Z into blocks can be optimized for the given controller computer hardware to balance, on the one hand, an opportunity for multi-thread computations using multiple processors and, on the other hand, the capability of a vector processor to handle multiple data and instructions.

Several embodiments determine on-line the entries of the preconditioner matrix using the pre-defined off-line map of selected entries of the approximate coefficient matrix. The selected entries of the approximate coefficient matrix can be efficiently determined on-line using the approximate coefficient function as follows.

An entire i-th column of the coefficient matrix can be determined by applying the coefficient function a( ) 601 to the coordinate vectors $e_i$, as in FIG. 6. An entire block of columns of the coefficient matrix can be determined by applying the coefficient function a( ) 601 to the relating block of the coordinate vectors, as in FIG. 7. The corresponding rows of the coefficient matrix can be determined by using a transpose operation to the already determined column, using the symmetry of the coefficient matrix.

Individual entries of the coefficient matrix can be determined on-line, e.g., by applying analytic formulas, derived off-line using the system model 102 and constraints 104. For example, in CMPC, where the coefficient function 601 is obtained applying the forward difference to analytically derived first derivatives, the individual entries of the analytic formulas describing the individual entries of the coefficient matrix can be obtained by taking second derivatives.

Figure 8:
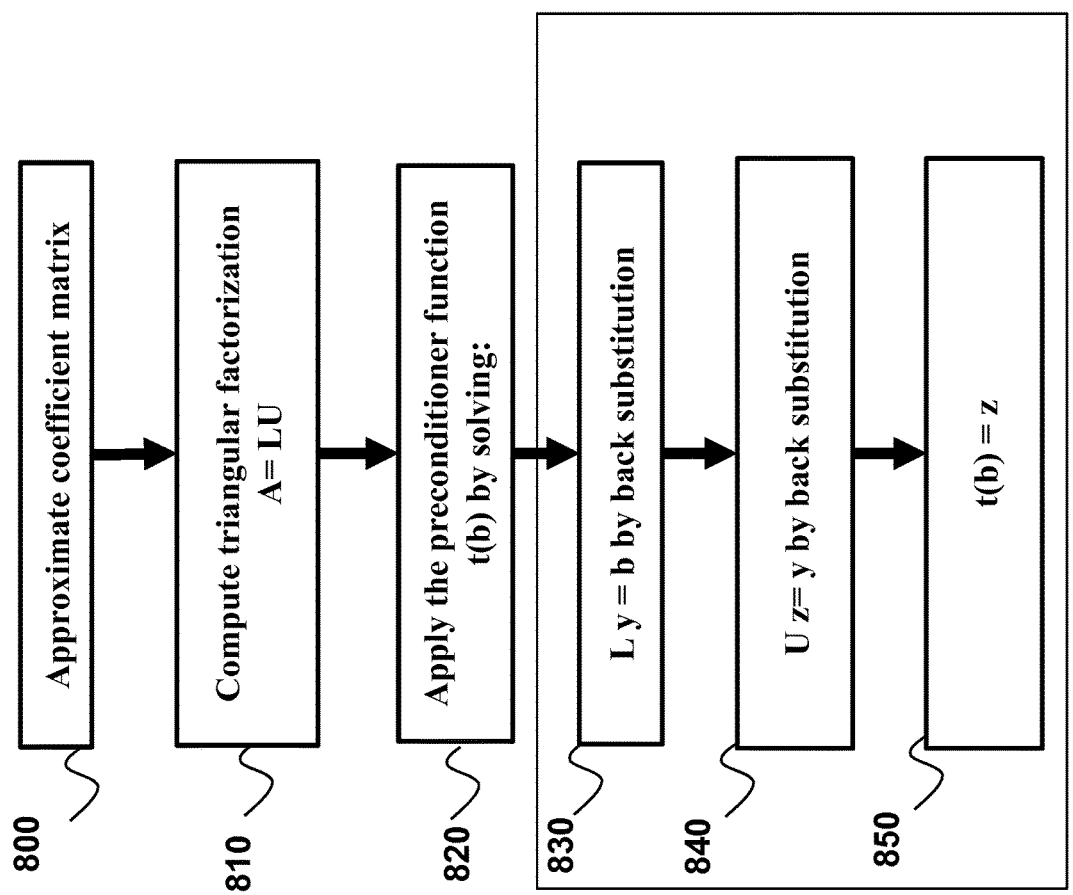
FIG. 8 is a block diagram of an embodiment that completes the already stored set of vectors to the full basis, and evaluates the coefficient function on this completion.
Figure 9:
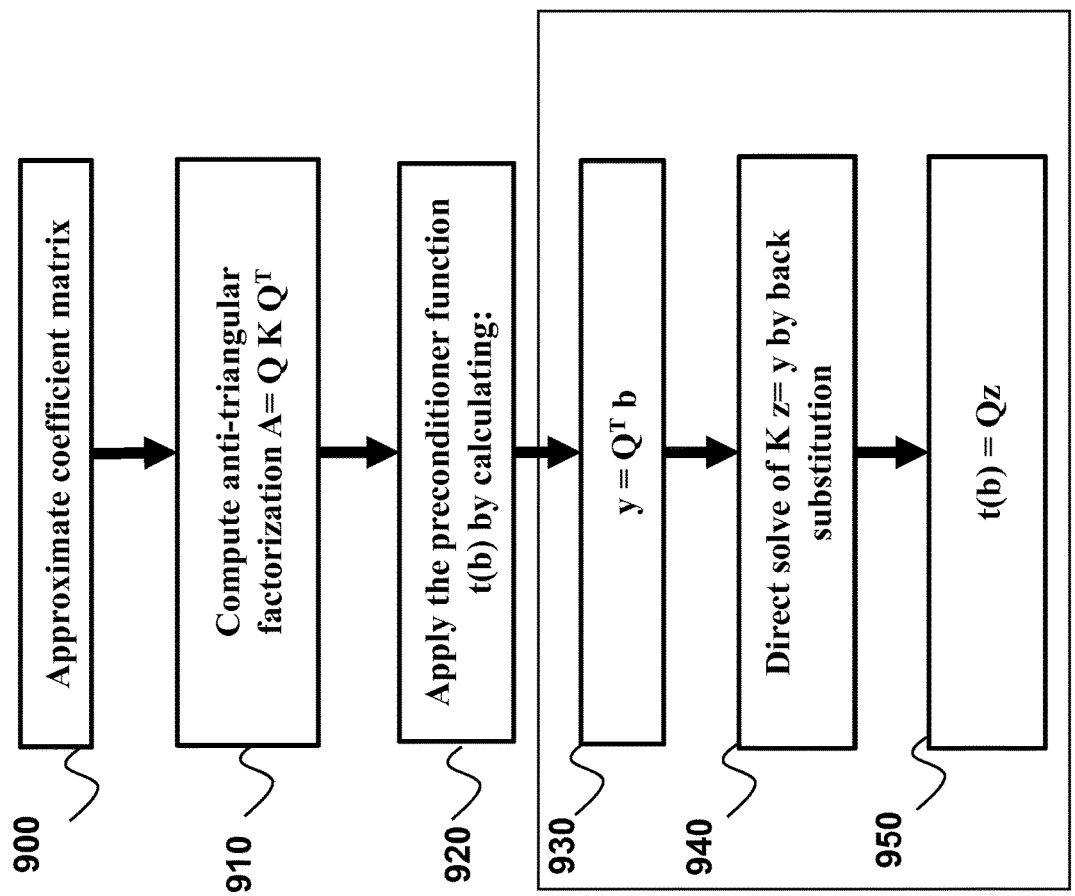
FIG. 9 is a diagram of a triangular lower-upper (LU) decomposition/factorization for determining a preconditioner according to an embodiment of the invention.
Figure 10:
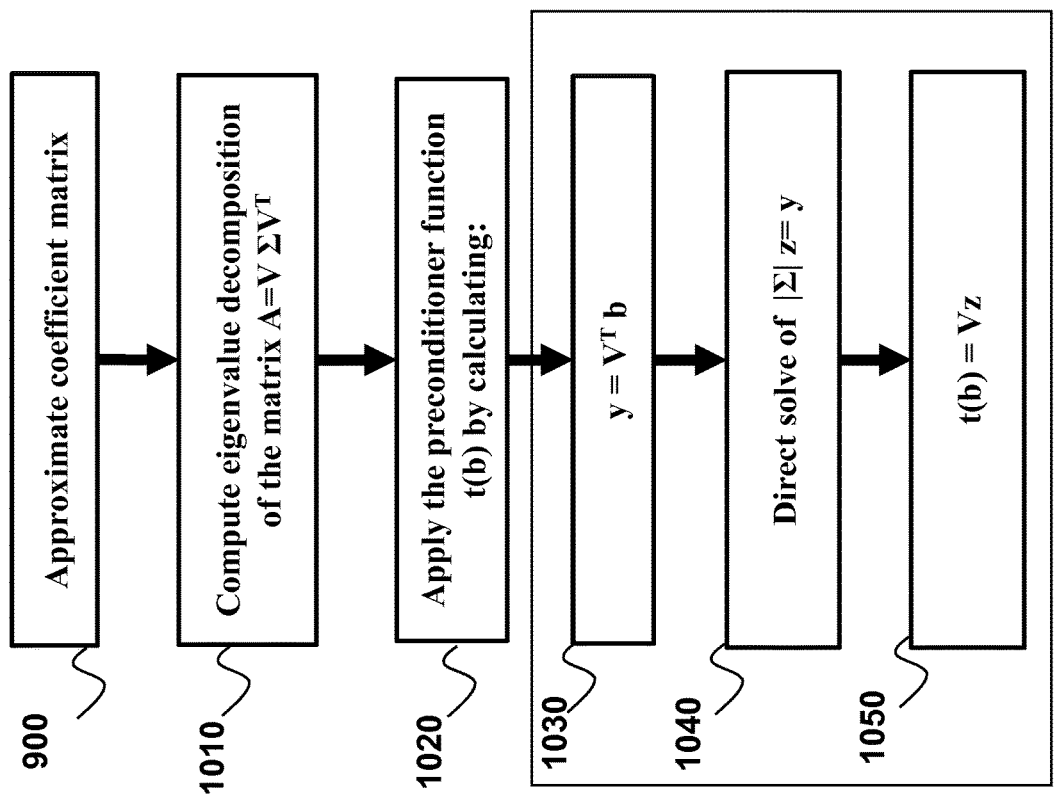
FIG. 10 is a diagram of another embodiment using eigenvalue decomposition of the coefficient matrix A to determine the preconditioner.

Having access to the entries of the coefficient matrix A allows determining a preconditioning function t( ) that approximates an inverse to the matrix coefficient function a( ). FIGS. 8, 9, and 10 show diagrams of exemplar embodiments that specify constructions and updates of the preconditioner based on various matrix factorizations and eigenvalue or singular value decompositions of the preconditioner matrix.

FIG. 8 shows an example of a triangular lower-upper (LU) factorization (or decomposition) of the preconditioner matrix 800. The approximate coefficient matrix A 800 is predetermined and stored in the memory. The preconditioner setup 810 determines the triangular factorization A=LU, where the matrix L is lower-triangular and the matrix U is upper-triangular. The preconditioner function application t(b) 820 includes the following steps. The matrix equation L y=b is solved 830 by back substitution using the fact that the matrix L is lower-triangular. The matrix equation U z=y is solved 840 by back substitution using the fact that the matrix U is upper-triangular. Finally, the preconditioner is determined 850 as t(b)=z.

When the approximate coefficient matrix A is symmetric, the lower-diagonal-transposed lower factorization $A=LDL^T$ is more efficient then the LU factorization. If A is symmetric positive definite, then the Cholesky factorization $A=LL^T$ is used for preconditioning in one embodiment of the invention.

In some situations, the orthogonal-upper factorization A=QR or the Schur factorization $A=QRQ^T$, where Q is orthogonal and R is triangular, may be useful for preconditioning.

FIG. 9 shows a diagram of an anti-triangular factorization (or decomposition) $A=Q K Q^T$ that uses orthogonal transformations Q and take advantage of the symmetry of the matrix A by selecting a symmetric anti-triangular matrix K, where T is a transpose matrix operation. The approximate coefficient matrix A 900 is predetermined and stored in the memory. The preconditioner setup 910 determines the anti-triangular factorization $A=Q K Q^T$, where the matrix Q is orthogonal and the matrix K is symmetric anti-triangular. The preconditioner function application t(b) 920 includes the following steps. The inverse of the matrix Q is applied 930 to the right side of the matrix equation b as $y=Q^T b$. The matrix equation K z=y is solved 940 by back substitution using the fact that the matrix K is anti-triangular. Finally, the preconditioner is determined 950 as t(b)=Q z.

This anti-triangular decomposition-based preconditioning results in a symmetric preconditioner $T=A^{-1}$ that is not positive definite, if the matrix A is not positive definite, which is taken into account in selecting a proper iterative solver, for example, preconditioned GMRES.

FIG. 10 shows a block diagram of another embodiment that can be used in addition or in alternative to on the embodiment of FIG. 9. In this embodiment, the preconditioner setup 1010 determines the eigenvalue decomposition of the matrix $A=V \Sigma V^T$, where V is an orthogonal matrix of the column eigenvectors, $\Sigma$ is a diagonal matrix made of eigenvalues, and the operation $^T$ denotes the matrix transpose. The eigenvalue decomposition is used 1020 to construct symmetric positive definite Absolute Value Preconditioner (AVP) given by $T=V|\Sigma|^{-1} V^T$, as shown in steps 1030, 1040, and 1050. In the direct solver 1040, the embodiment inverts the absolute values of the diagonal entries of the diagonal matrix $\Sigma$. When A is not symmetric, the AVP preconditioner is constructed by polar decomposition of A or singular value decomposition of A.

The advantage of the symmetric positive definite AVP T is that it allows the use of the preconditioned MINRES iterative method to solve the matrix equation Ax=b. MINRES may converge more reliably and faster compared to preconditioned GMRES, thus leading to reliable controllers with high clock rates capable of controlling fast changing systems.

Figure 11:
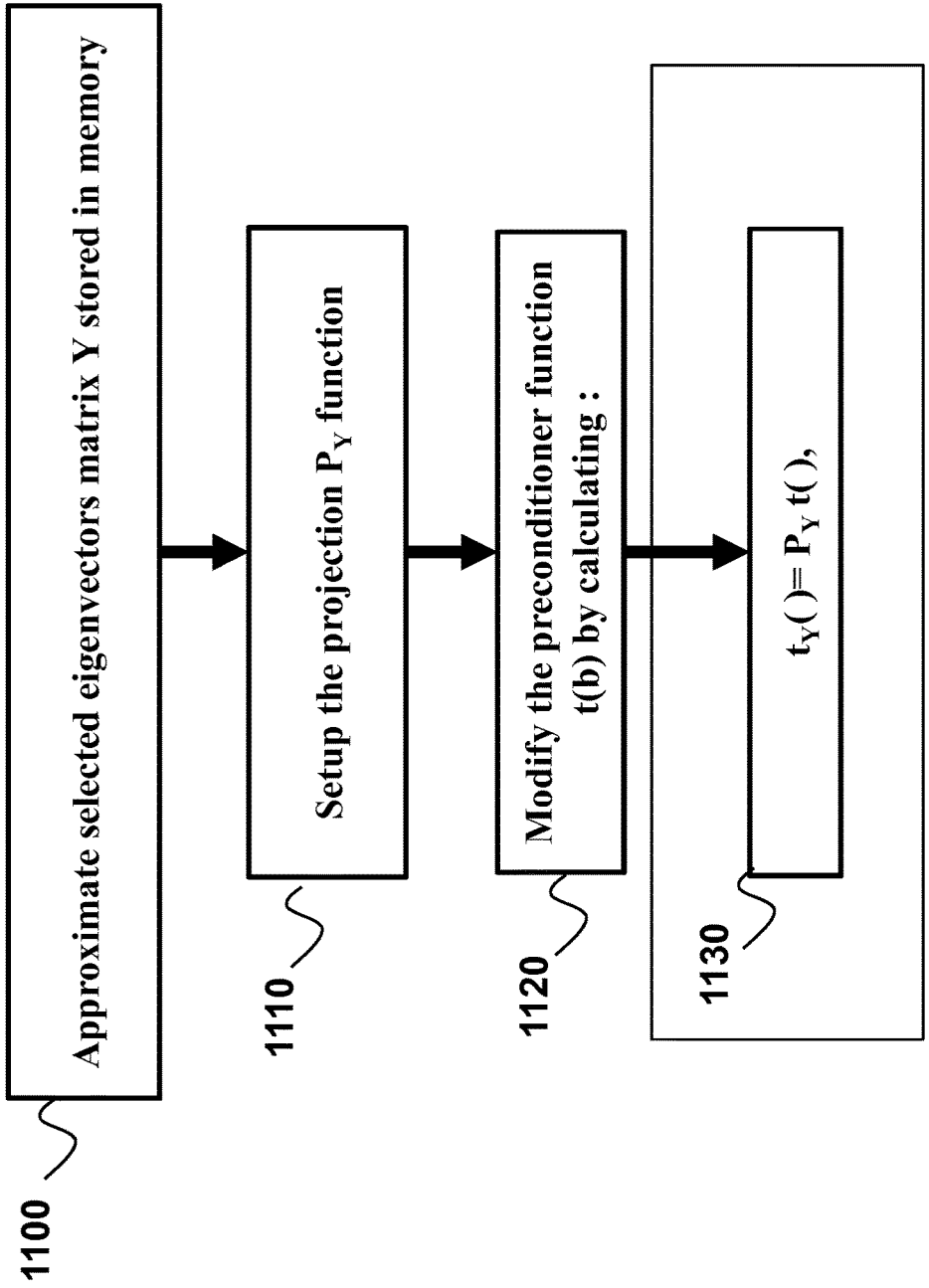
FIG. 11 is a diagram of another embodiment that uses the eigenvalue decomposition to modify a preconditioner function.

FIG. 11 shows another embodiment that modifies 1120 the preconditioning function t( ) by using the eigenvalue or singular value decomposition of the matrix t(A). This embodiment is based on a realization that, if the preconditioner has not been updated for several time steps, its quality deteriorates, resulting in slowing the convergence of the preconditioned iterative method for solving Ax=b. Mathematically, such a slowdown is related to the increase in the condition number of the matrix t(A), and can be cured by modifying the preconditioner deflating or augmenting several (using a threshold) singular or eigenvectors Y 1100 of the matrix t(A) that are responsible for the slow convergence.

For example, let the preconditioner be symmetric positive definite, such as AVP, and let Y denote a matrix 1100, with columns—eigenvectors corresponding to several smallest and several largest by absolute value eigenvalues of t(A). These eigenvectors may, for example, be computed at the previous time step. One embodiment modifies 1120 the preconditioning function t( ) into a new preconditioning function $t_Y(\ )$, using deflation to remove the eigenvectors contained in Y from consideration, and thus to accelerate the convergence of the preconditioned iterative solver. For example, the embodiment can mathematically 1130 define $t_Y(\ )$ as $t_Y(\ )=P_Y t(\ )$, where $P_Y$ is a projector 1110 on the complement to the range of the matrix Y.

Additionally or alternatively some embodiments are based on realization that a slow convergence of an iterative solver for the matrix equation Ax=b may be originated from a small dimensional subspace. Detecting this subspace and deflating it in the preconditioner function can accelerate the convergence of the iterative solver. This subspace is related to eigenvectors of the error propagation operator and can be computed at the previous time step or during the course of iterations. Since the exact coefficient function changes on every time step, one embodiment updates at least a part of the deflating subspace during and concurrently, i.e. in parallel, to the execution of the iterative solver for solving the CMPC matrix equation Ax=b.

Sparse Reconstruction of the Coefficient Matrix

Some embodiments of the invention are based on recognition that when the coefficient matrix is constructed using the exact or approximate coefficient function, some entries on specific locations in the matrix are greater, and sometimes significantly greater, than entries on other locations. Such a pattern is repeatable for different calculations, interactions and types of the control system. Therefore, it is possible to determine off-line a map of locations identifying each location of an entry in the approximate coefficient matrix as either significant or insignificant.

Some embodiments of the invention are based on realization that for purpose of determining the solution vector, the non-zero insignificant values are important. But, surprisingly, after a number of different tests and experiments, it was realized that presence or absence of those non-zero insignificant values for purpose of determining a preconditioner have a minimal effect on convergence of iterative solver.

Accordingly, some embodiments of the invention update entries of an approximate coefficient matrix only at locations identified in a map of locations as significant and determine a preconditioner using the approximate coefficient matrix.

Figure 12:
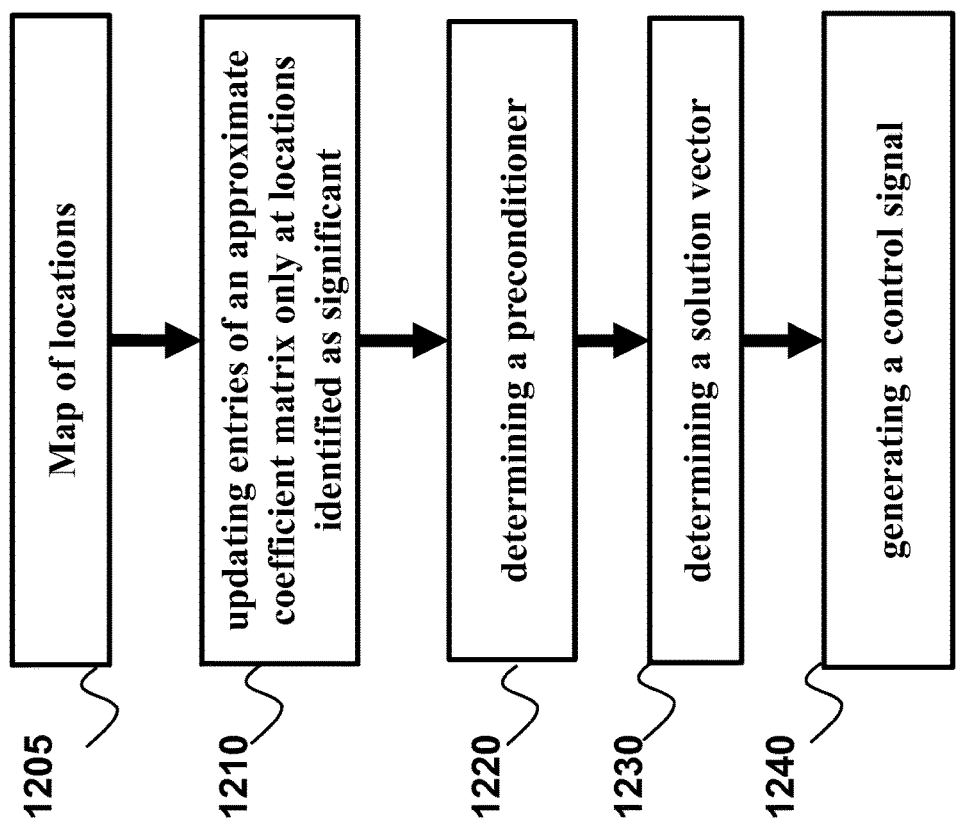
FIG. 12 is a flow chart of a method for a continuation model predictive control (CMPC) of a system according to some embodiments of the invention.

FIG. 12 shows a block diagram of a method for a continuation model predictive control of a system according to one embodiment of the invention exploiting above-mentioned realization. The embodiment updates 1210 entries of an approximate coefficient matrix only at locations identified in a map of locations 1205 as significant. For example, the entries are updated using one or combination of an approximate coefficient function and an exact coefficient function according to the map of locations that identifies each location of an entry in the approximate coefficient matrix as either significant or insignificant. The map of locations can be determined off-line and stored in a memory operatively connected to the processor, e.g., the memory 202.

The method determines 1220 a preconditioner using the approximate coefficient matrix and determines 1230 a solution vector by solving a matrix equation of the CMPC with a coefficient matrix defined by an exact coefficient function at a current time step of a control using an iterative method with the preconditioner. As described above, the approximate coefficient function applied to a vector approximates a result of an application of the exact coefficient function to the vector. Next, the method generates a control signal for controlling the system using the solution vector.

Figure 13:
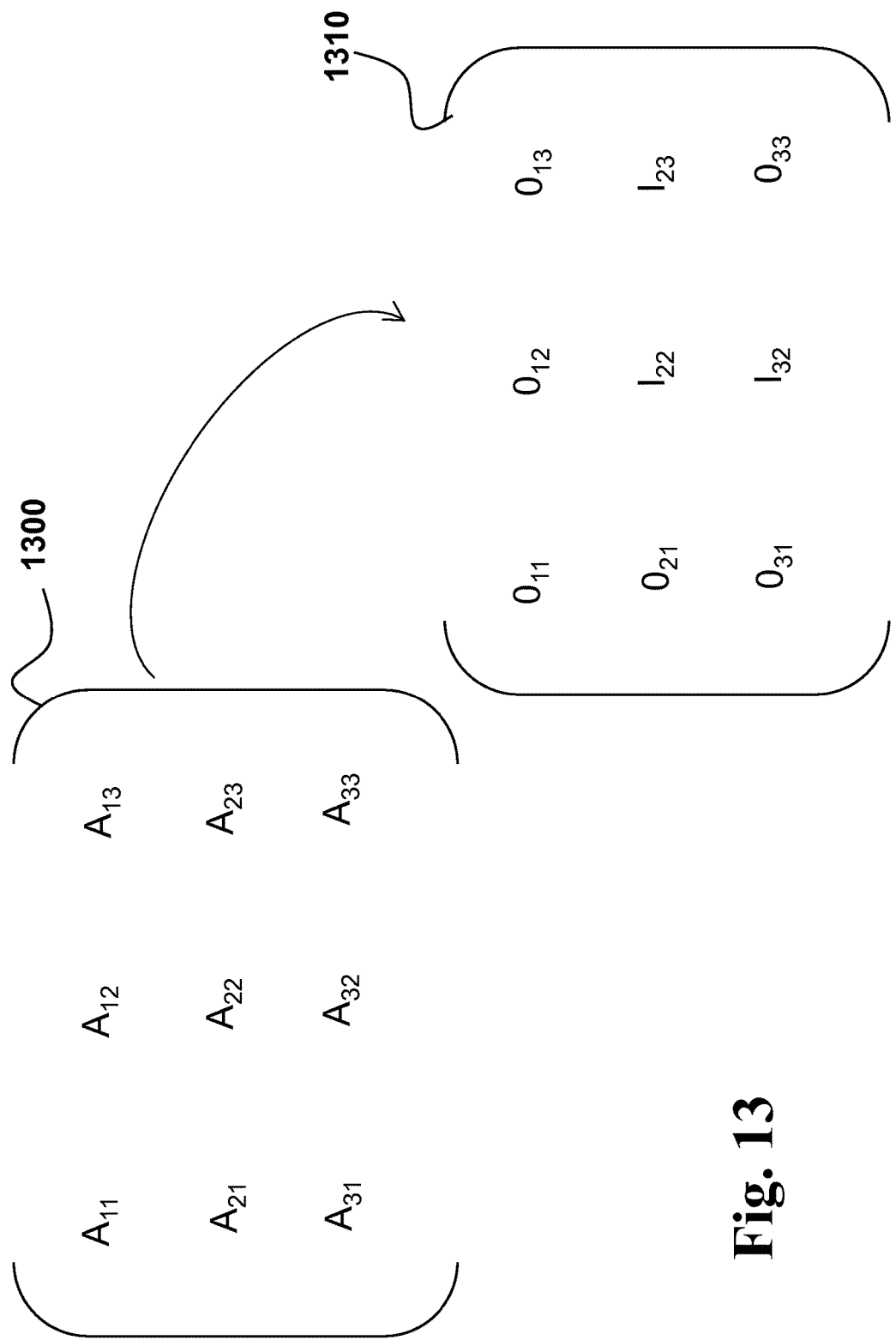
FIG. 13 is a schematic of the coefficient matrix of the matrix equation of CMPC in a form of matrix blocks.

FIG. 13 shows an example of the map of locations identifying each block entry of the coefficient matrix in a block form 1300 as significant or insignificant. For example, the map of locations identifies the blocks with indices 22, 23, and 32 as significant, while all other blocks are insignificant in this example. The map of locations in this example can be a binary 3-by-3 matrix 1310 with zero entries indicating the locations of insignificant blocks, and entries one for the locations of significant blocks. For the symmetric coefficient matrix, the binary matrix of the indicators (zero or one) of the significance is also symmetric, and thus, only the upper triangular part of the binary matrix of the indicators needs to be stored. The map of location can have different forms and can identify each entry of the coefficient matrix individually or as part of a group or block of entries, e.g., in a form of matrix blocks. In some embodiments, the map of locations is determined off-line either analytically or numerically without actually constructing the matrix A on-line.

For example, in some embodiments, the coefficient matrix is Hessian matrix of the Lagrange function or the Schur complement of the Hessian matrix. The Hessian matrix is sparse, i.e. most of its entries are zero. The nonzero entries define the map of locations and form several block diagonals or block rows and columns, or combinations of both. The block size is usually small, which allows determining the map of locations analytically. For example, the nonzero entries can be defined by analytic formulas and/or by the coefficient function.

Similarly, the Schur complement of the Hessian has more involved structure of nonzero entries, in which some non-zero entries are insignificant. For example, if variations of some variables cause a change of the Lagrange function between neighboring continuation steps below a threshold, then such variations can be discarded, which results in a simple sparse structure of significant entries suitable for efficient preconditioning. This behavior is often observed for state and costate variables, because they are multiplied by the time step in the Lagrange function.

Figure 14:
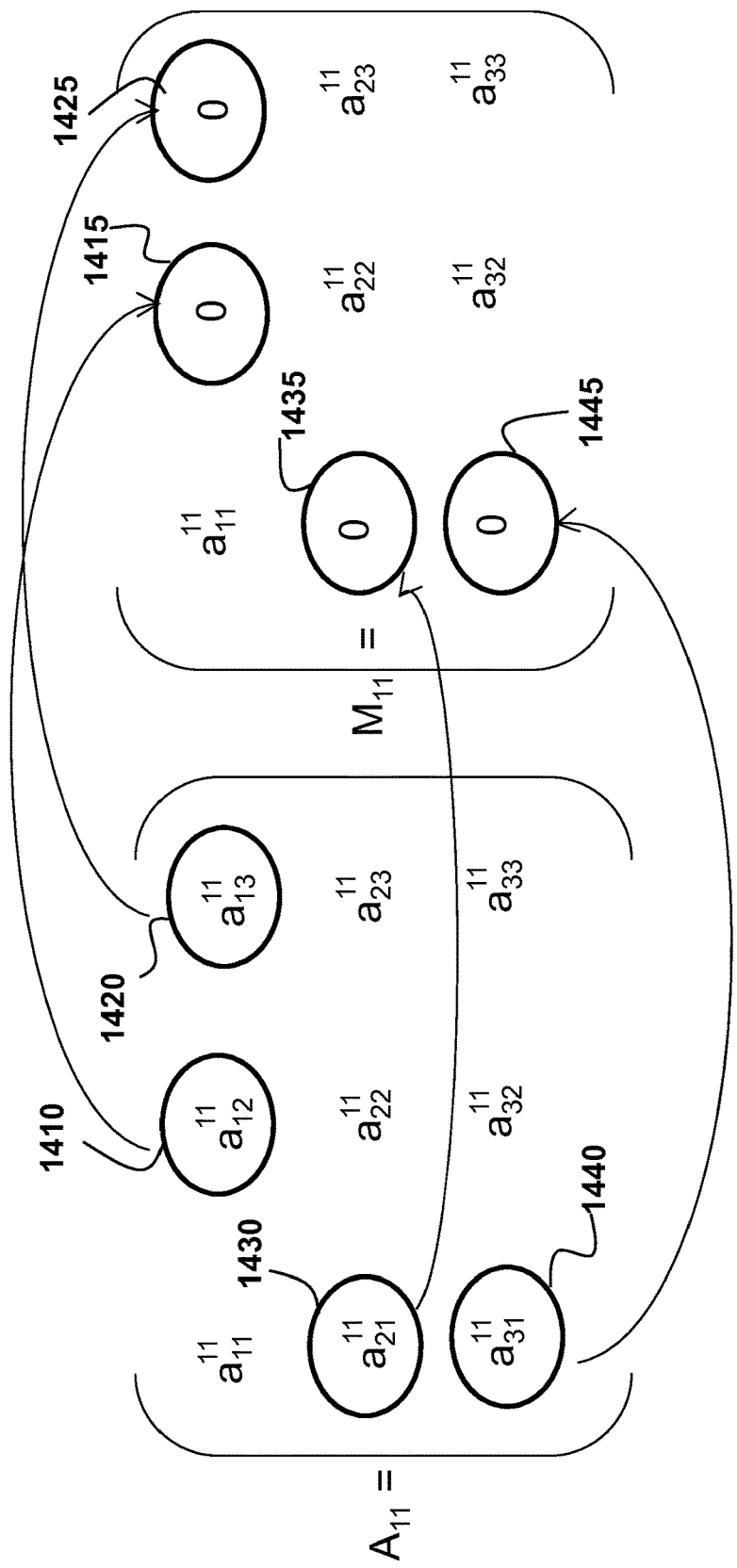
FIG. 14 is a schematic of the matrix block of the coefficient matrix of the matrix equation of CMPC with some negligibly small entries, and a corresponding matrix block of a coefficient matrix, with zero entries substituting the small entries.

FIG. 14 shows the matrix block of the coefficient matrix A of the matrix equation of CMPC with some negligibly small entries 1410, 1420, 1430 and 1440 determined according to the map of locations, and a corresponding matrix block of an approximate coefficient matrix M, with default, e.g., zero entries 1415, 1425, 1435, and 1445 substituting the small entries. In such a manner, the map of locations defines the sparsity pattern of the approximate coefficient matrix B, element-by-element or block-by-block.

Figure 15:
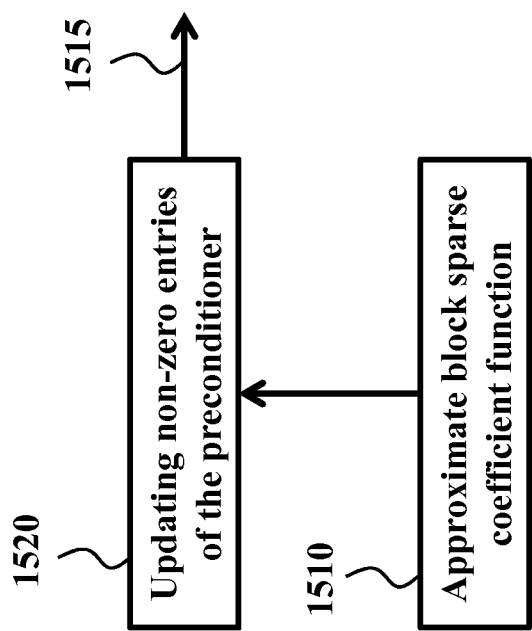
FIG. 15 is a flow chart of a method that determines elements of the approximate coefficient matrix according to some embodiments of the invention.

FIG. 15 shows a flow chart of a method according to one embodiment that determines the matrix blocks of the approximate coefficient matrix B directly, without first determining on-line the exact coefficient matrix A. This embodiment determines the approximate coefficient function 1510 in the block sparse form and updates 1520 only the significant entries of the approximate coefficient matrix B to determine the preconditioner 1515. The method of FIG. 15 results in a computationally inexpensive high quality preconditioner 1515, leading to faster and more efficient on-line performance of the controllers based on continuation model predictive control.

In one embodiment, the preconditioning setup includes the lower-upper (LU) factorization of the approximate coefficient matrix M=A, as in FIG. 8. The factorization cost depends on the structure of nonzero entries of M. If the nonzero entries include small number of block diagonals and/or block rows and columns, e.g. as the arrow looking structure, the cost is low. Moreover, the cost of application of the preconditioner is proportional to the number of nonzero elements in the factors L and U.

Figure 16A:
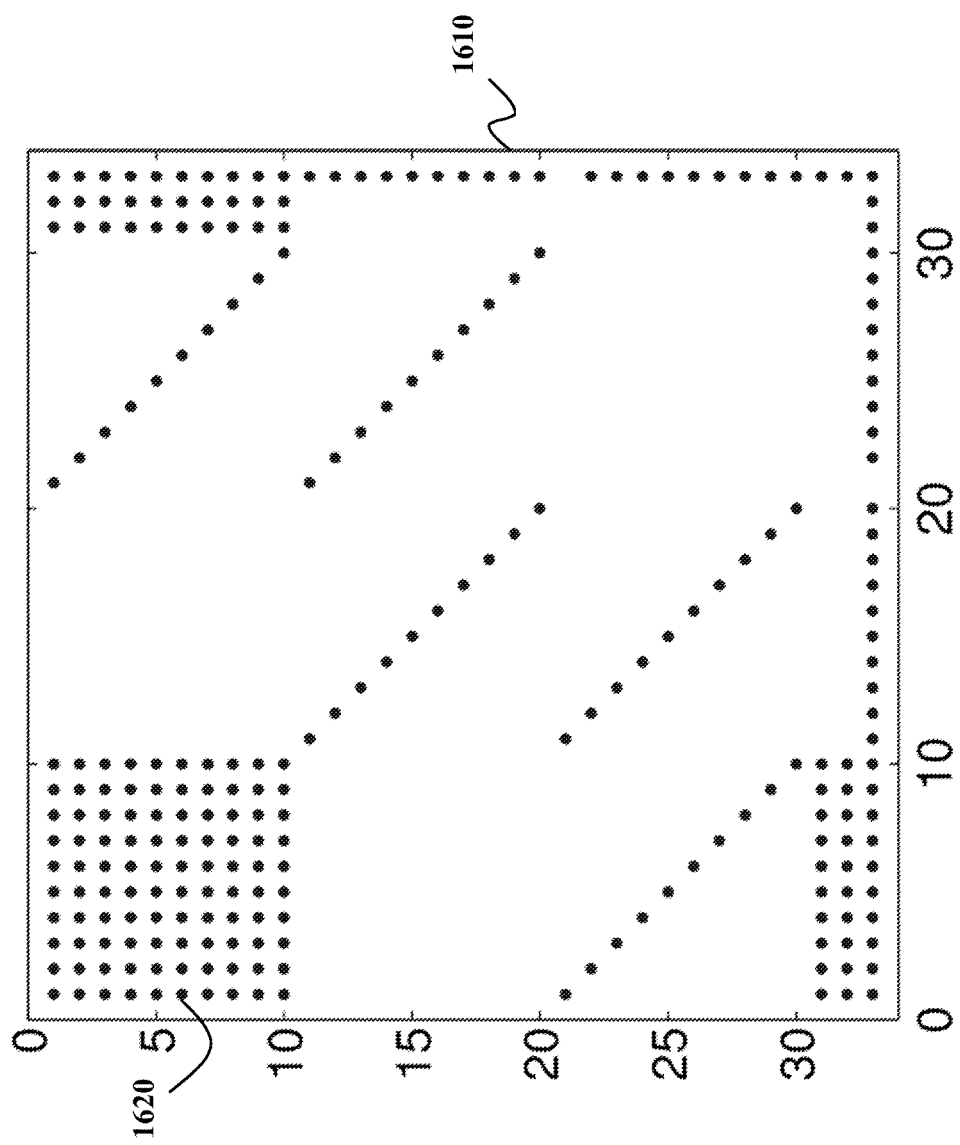
FIGS. 16A, 16B, 16C, 16D and 16E show schematic of manipulation of the coefficient matrix for determining the preconditioner according to one embodiment of the invention.

FIG. 16A show a schematic of a coefficient matrix A 1610 determined for a minimum-time problem of the continuation model predictive control according to one embodiment of the invention. The coefficient matrix A 1610 is sparse but includes a number of non-zero entries 1620. The entries 1620 can be a single element or a block of elements. The columns of the coefficient matrix A are determined by the coefficient function a( ). Some nonzero entries of A are small, i.e. insignificant values for preconditioning, and can be replaced with zeros. In some embodiments, the decision about the insignificance is made analytically, without computation.

Figure 16B:
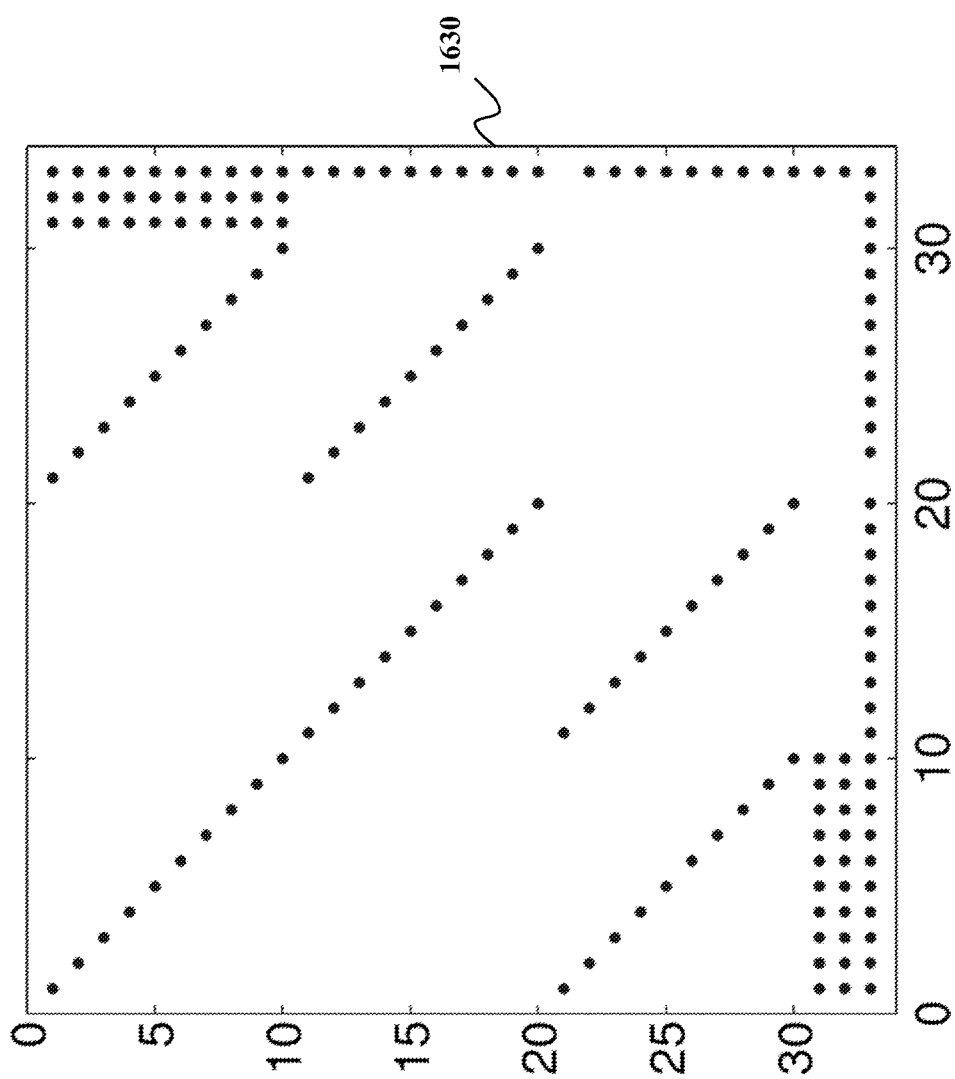

FIG. 16B shows a schematic of the approximate coefficient matrix M 1630 resulting from replacing the insignificant entries of the coefficient matrix 1610 with zeros according to one embodiment of the invention. The resulting approximate coefficient matrix M has an advantageous sparse structure and can be used as a preconditioning matrix. Most of the entries of the matrix M are determined approximately for the preconditioning purpose. Some embodiments use fast formulas for determining entries based on a "frozen" type elimination of the state and costate variables. As a result, all nonzero entries of the matrix M can be computed by O(N) arithmetic operations, where N is the number of grid points on the receding horizon.

Figure 16C:
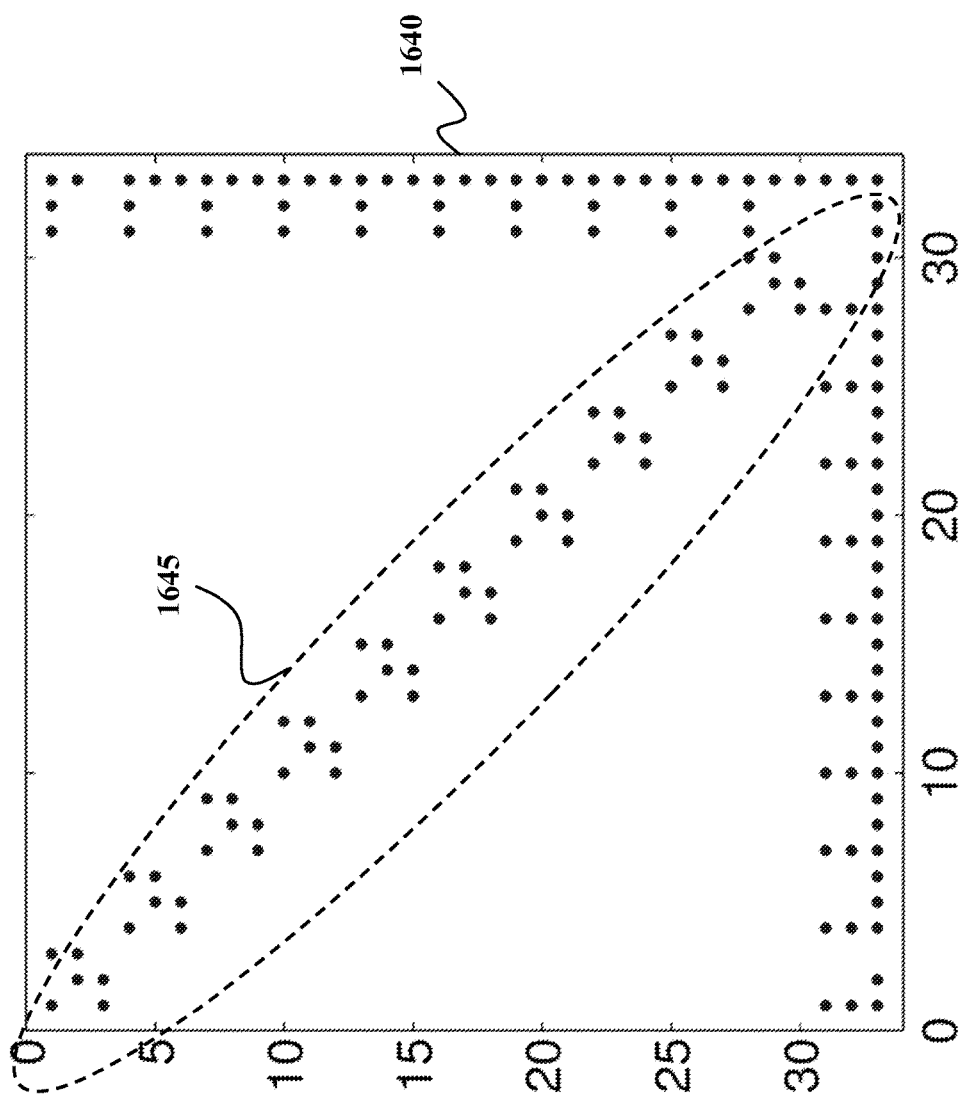

FIG. 16C shows a schematic of a permuted preconditioning matrix $\tilde{M}$ 1640 determined by one embodiment of the invention. The embodiment permutes columns and rows of the matrix M 1630 to move the non-zero values of the permuted preconditioning matrix $\tilde{M}$ 1640 toward a diagonal position. For example, the embodiment performs simultaneous permutation P of the rows and columns of the matrix M, such that the diagonals of the permuted preconditioning matrix $\tilde{M}$ 1640 are gathered into a narrow banded matrix 1645. Because $P^T P=I$, the equation $Mx=r$ is equivalent to the equation $\tilde{M}Px=Pr$, where $\tilde{M}=PMP^T$. Such a permutation simplifies the LU factorization of the approximate coefficient matrix M.

Figure 16E:
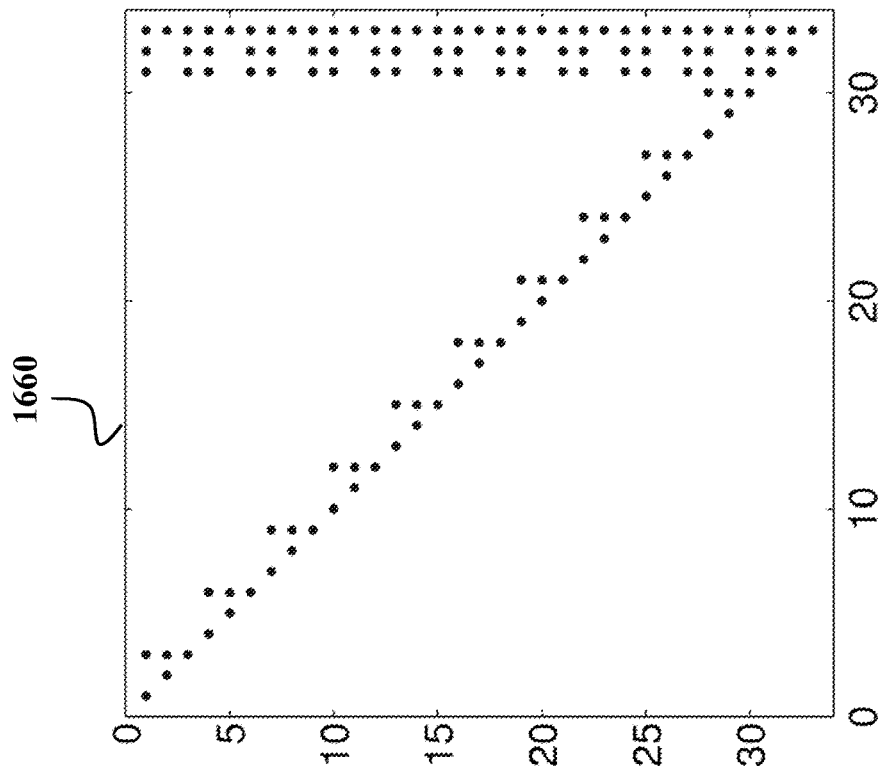
Figure 16D:
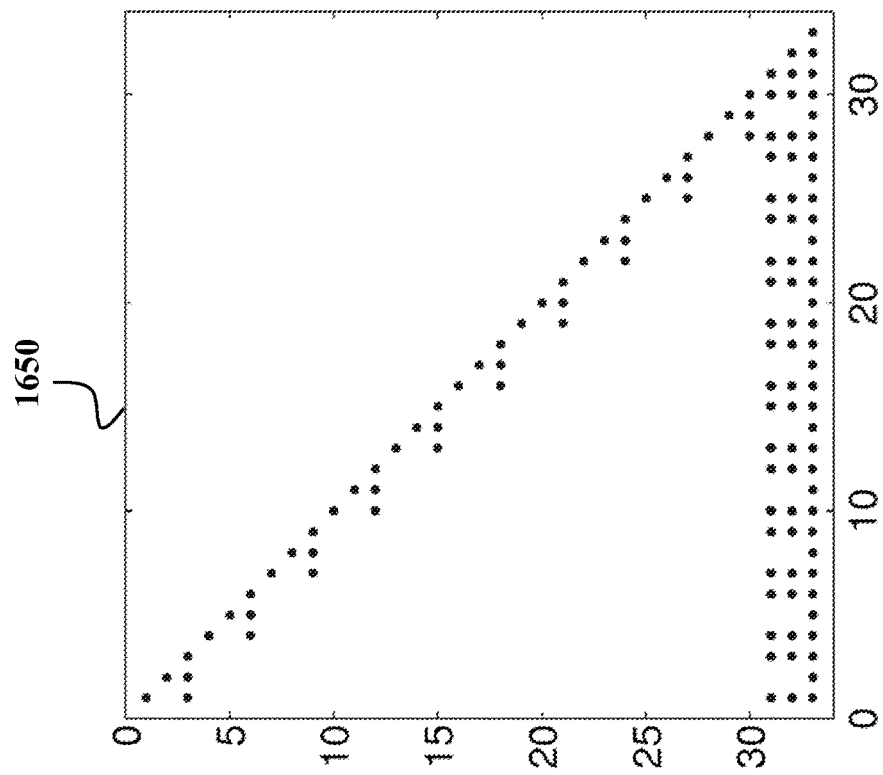

FIG. 16D and FIG. 16E show schematics of a matrix 1650 for a lower triangular factor L and a matrix 1660 for an upper triangular factor U of the LU factorization of the approximate coefficient matrix M according to one embodiment of the invention. In this embodiment, the LU factorization of the matrix $\tilde{M}$ has the triangular factors L and U. Because $\tilde{M}=LU$, the solution of the preconditioning equation $Mx=r$ can be simplified and evaluated in O(N) arithmetic operations according to $$x=P^T(U^{-1}(L^{-1}(Pr))).$$

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for model predictive control (MPC) of a system, comprising:
   determining on-line entries of an approximate coefficient matrix only at locations identified in a map of locations as significant, wherein the entries are determined to approximate an exact coefficient matrix of the MPC, and wherein the map of locations identifies each location for an entry in the approximate coefficient matrix as either significant or insignificant;
   determining at least a part of a preconditioner matrix on-line using the approximate coefficient matrix, wherein the preconditioner matrix is sparse and different from a block diagonal matrix and different from a block tri-diagonal matrix;
   determining a solution vector on-line by solving a matrix equation of the MPC with the exact coefficient matrix using an iterative method with the preconditioner matrix;
   generating a control signal on-line to control the system in real time using the solution vector; and
   transmitting the generated control signal to the system, wherein steps of the method are performed by at least one processor.

2. The method of claim 1, further comprising:
   determining the map of significant locations off-line and storing the map of locations in a memory operatively connected to the processor, wherein a location mapped as not significant is determined by one or a combination of an analytical derivation and numerical simulation by checking whether annulling an entry of the approximate coefficient matrix at the location in the preconditioner matrix maintains a convergence speed of the iterative method with the preconditioner matrix larger than a predefined first threshold.

3. The method of claim 2, further comprising:
   determining the map of significant locations off-line and storing the map of locations in a memory operatively connected to the processor, wherein the significant locations are determined as locations of the largest by absolute value entries of the approximate coefficient matrix, and wherein the number of the non-zero entries identified as significant by the map of locations is determined by one or a combination of a predefined fraction of the total number of entries of the approximate coefficient matrix and a predefined second threshold bounding below the absolute values of the significant entries of the approximate coefficient matrix.

4. The method of claim 1, wherein the preconditioner matrix is determined as a block matrix, wherein each block is determined as a sum of a block-diagonal matrix and a low-rank matrix having the rank lower than the rank of the preconditioner matrix, wherein the locations and sizes of the blocks are determined off-line.

5. The method of claim 1, further comprising:
   determining an approximate coefficient function and an exact coefficient function, wherein the approximate coefficient function applied to a vector approximates a result of an application of the exact coefficient function to the vector, wherein the approximate coefficient function applied to a vector returns a product of the approximate coefficient matrix and the vector, and wherein the exact coefficient function applied to the vector returns a product of the exact coefficient matrix and the vector; and updating the entries of the approximate coefficient matrix on-line using one or a combination of the approximate coefficient function and the exact coefficient function.

6. The method of claim 1, further comprising:
determining the approximate coefficient matrix using an arithmetic having a precision lower than a precision of an arithmetic for determining the exact coefficient matrix.

7. The method of claim 1, further comprising:
determining the approximate coefficient matrix using an approximate elimination of at least one block of entries in the exact coefficient matrix.

8. The method of claim 1, further comprising:
determining the exact coefficient matrix using a model of the system;
approximating the model of the system; and
determining the approximate coefficient matrix using the approximate model of the system.

9. The method of claim 1, wherein the approximate coefficient matrix is the exact coefficient matrix determined for a different time step of the control.

10. The method of claim 1, wherein the solving is performed by a controller processor during a main control routine, further comprising:
determining one or a combination of the approximate coefficient matrix, the preconditioner matrix, and the factorization of the preconditioner matrix in parallel with the main control routine using an at least one additional processor.

11. The method of claim 1, wherein the MPC is a continuation MPC, approximately solving necessary optimality conditions for the MPC by a forward-difference Newton-Krylov preconditioned iterative method.

12. The method of claim 1, wherein determining the preconditioner matrix comprises: permuting rows and columns of the approximate coefficient matrix to produce the preconditioner matrix, wherein the permutation pattern is determined off-line to order the rows and columns for minimizing memory usage and costs of the factorization of the preconditioner matrix.

13. The method of claim 1, further comprising:
factorizing the preconditioner matrix on-line, using a factorization method, wherein the factorization comprises one or a combination of:
lower-upper, lower-diagonal-lower transposed, Schur, Cholesky, orthogonal-upper, and anti-triangular factorizations, polar, eigenvalue and singular value decompositions, and block versions thereof.

14. The method of claim 1, wherein the iterative method comprises one or a combination of:
a preconditioned stationary method, a preconditioned Krylov subspace method, a preconditioned minimal residual method, a preconditioned generalized minimal residual method, a preconditioned gradient method, a preconditioned Chebyshev method, and a preconditioned Nesterov method.

15. The method of claim 1, wherein determining the preconditioner comprises:
determining the preconditioner matrix as a symmetric positive definite matrix, and wherein the iterative method is a preconditioned minimal residual method.

16. The method of claim 1, further comprising:
determining a rate of convergence of the iterative method; and
updating the preconditioner, if the rate of convergence is below a threshold.

17. The method of claim 1, further comprising:
determining the iterative method using a preconditioner function, wherein the preconditioner function applied to a vector approximates a product of an inverse of the preconditioner matrix and the vector.

18. The method of claim 1, further comprising:
updating at least partially the preconditioner matrix during an execution of the iterative method of the current time step, wherein the iterative method is restarted synchronously with the preconditioner matrix update or is a flexible iterative method, such that the preconditioner matrix is a variable preconditioner matrix.

19. The method of claim 1, wherein the determining the solution vector comprises:
updating the matrix equation in the iterative method at the current time step of the control without restarting iterations of the iterative method from a previous time step of the control wherein the iterative method is a flexible iterative method, such that the matrix equation is a variable matrix equation.

20. A model predictive controller for controlling a system according to a control signal generated at each time step, comprising:
a memory to store a model of the system, an approximate coefficient matrix and an exact coefficient matrix, and a map of locations identifying each location of an entry in an approximate coefficient matrix as significant;
at least one processor determining a preconditioner matrix, wherein the preconditioner matrix is not a block (tri-)diagonal matrix, wherein the processor determines entries of the approximate coefficient matrix only at locations identified in the map of locations as significant, and wherein the processor solves a matrix equation with the exact coefficient matrix using an iterative method with a factorization of the preconditioner matrix to produce a solution vector of a system of equations with the exact coefficient matrix; and
a controller generating the control signal for controlling the system using the solution vector and transmitting the generated control signal to the system.

* * * * *